United States Patent
Zhang et al.

(10) Patent No.: US 12,249,077 B2
(45) Date of Patent: Mar. 11, 2025

(54) CONSISTENCY MEASURE FOR IMAGE SEGMENTATION PROCESSES

(71) Applicant: QUALCOMM Incorporated, San Diego, CA (US)

(72) Inventors: Yizhe Zhang, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 602 days.

(21) Appl. No.: 17/524,253

(22) Filed: Nov. 11, 2021

(65) Prior Publication Data

US 2022/0156943 A1   May 19, 2022

Related U.S. Application Data

(60) Provisional application No. 63/113,725, filed on Nov. 13, 2020.

(51) Int. Cl.
*G06T 7/174* (2017.01)
*G06N 3/04* (2023.01)
(Continued)

(52) U.S. Cl.
CPC .............. *G06T 7/174* (2017.01); *G06N 3/04* (2013.01); *G06T 7/11* (2017.01); *G06T 7/194* (2017.01);
(Continued)

(58) Field of Classification Search
None
See application file for complete search history.

(56) References Cited

U.S. PATENT DOCUMENTS

| | | | |
|---|---|---|---|
| 2018/0211393 A1* | 7/2018 | Chen | G06T 7/174 |
| 2019/0304134 A1* | 10/2019 | Mauchly | G06T 15/20 |
| 2020/0074642 A1 | 3/2020 | Wilson et al. | |

FOREIGN PATENT DOCUMENTS

EP     3683767 A1 *  7/2020  ............. G06N 20/00

OTHER PUBLICATIONS

Varghese, Serin, et al. "Unsupervised temporal consistency metric for video segmentation in highly-automated driving." Proceedings of the IEEE/CVF conference on computer vision and pattern recognition workshops. 2020. (Year: 2020).*

(Continued)

*Primary Examiner* — Samah A Beg
(74) *Attorney, Agent, or Firm* — Polsinelli/Qualcomm

(57) ABSTRACT

Techniques are provided for determining consistency measures for image segmentation. For instance, a system can determine a first segmentation feature associated with a first segmentation mask of a first image frame. The system can determine a second segmentation feature associated with a second segmentation mask of a second image frame. The second segmentation feature corresponds to the first segmentation feature. The system can determine a first image feature of the first image frame that corresponds to the first segmentation feature and a second image feature of the second image frame that corresponds to the second segmentation feature. The system can determine a first similarity measurement between the first image feature and the second image feature. The system can further determine a temporal consistency measurement associated with the first image frame and the second image frame based at least in part on the first similarity measurement.

30 Claims, 19 Drawing Sheets

(51) Int. Cl.
G06T 7/11 (2017.01)
G06T 7/194 (2017.01)

(52) U.S. Cl.
CPC ............. *G06T 2207/10016* (2013.01); *G06T 2207/20081* (2013.01); *G06T 2207/20084* (2013.01)

(56) References Cited

OTHER PUBLICATIONS

Zhong, Di, and Shih-Fu Chang. "Long-term moving object segmentation and tracking using spatio-temporal consistency." Proceedings 2001 International Conference on Image Processing (Cat. No. 01CH37205). vol. 2. IEEE, 2001. (Year: 2001).*

International Search Report and Written Opinion—PCT/US2021/059096—ISA/EPO—Mar. 11, 2022.

Qin F., et al., "Improving Semantic Segmentation Via Label Propagation and Temporal Consistency", 2019 IEEE International Conference on Signal, Information and Data Processing (ICSIDP), IEEE, Dec. 11, 2019, pp. 1-5, XP033813596, DOI: 10.1109/ICSIDP47821.2019.9173474 abstract figure 1.

Stankiewicz O., et al., "Estimation of Temporally-Consistent Depth Maps from Video with Reduced Noise", 2015 3DTV-Conference: The True Vision-Capture, Transmission and Display of 3D Video (3DTV-CON), IEEE, Jul. 8, 2015, pp. 1-4, XP033194672, DOI: 10.1109/3DTV.2015.7169369, abstract.

Varghese S., et al., "Unsupervised Temporal Consistency Metric for Video Segmentation in Highly-Automated Driving", 2020 IEEE/CVF Conference on Computer Vision and Pattern Recognition Workshops (CVPRW), IEEE, Jun. 14, 2020, pp. 1369-1378, XP033799076, DOI: 10.1109/CVPRW50498.2020.00176, abstract.

* cited by examiner

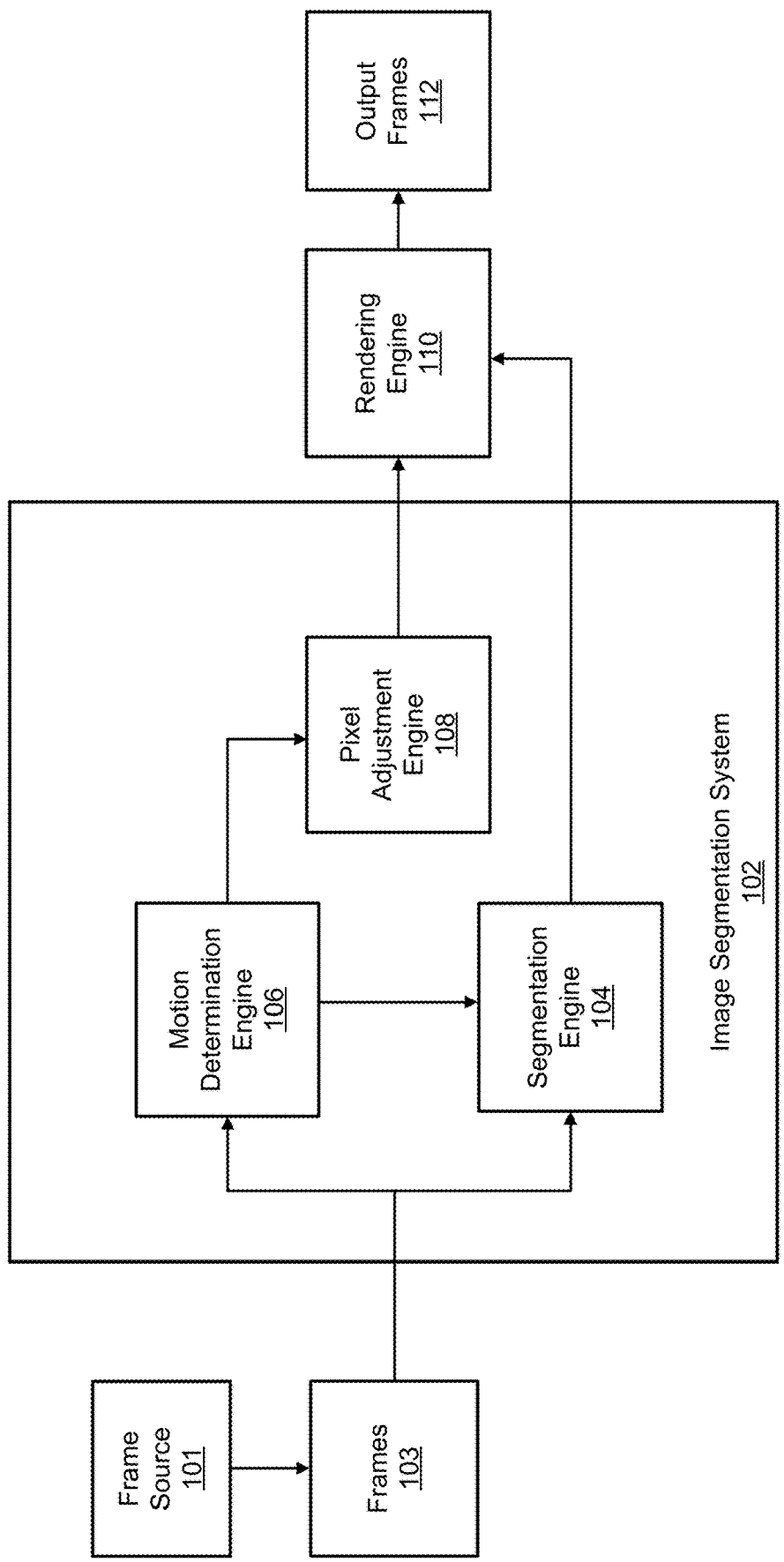

| Setup | $TC_{t-1 \to t}$ ↑ | Expectation Based on the Setup |
|---|---|---|
| Image w/ Shift | 0.9029 (HRNet w18) | TC Should be High |
| Input Raw Image *Changing*, Output Segmentation *Not Changing* | 0.3981 (HRNet w18) | TC Should be Low |
| Input Raw Image *Not Changing*, Output Segmentation *Changing* | 0.3976 (HRNet w18) | TC Should be Low |
| Input Raw Image *Not Changing*, Output Segmentation *Not Changing* | ~1.0 (HRNet w18) | TC Should be High |

FIG. 7B

| Cityscapes Val Set | Mean IoU ↑ | $TC_{t-1 \to t}$ ↑ | Network Type | Visual Inspection |
|---|---|---|---|---|
| HRNet W18 | 76.2 | 0.571 | w/o Temporal Information | -- |
| HRNet W18 + Temporal | 75.1 | 0.620 | w/ Temporal Information | Less Flickering Thank w18 |
| HRNet W48 | 81.1 | 0.604 | w/o Temporal Information | -- |
| HRNet W48 + Temporal | 79.8 | 0.632 | w/ Temporal Information | Less Flickering Thank w48 |

FIG. 7C

| Cityscapes Val Set HRNetw18 t-1->t | Described TC | CVPRW20 TC [1] |
|---|---|---|
| Case-1: Raw Image Changing, Segmentation Changing | 0.571 (500 Samples Larger than Case-2) | 0.496469 (223 Samples Larger than Case-2) |
| Case-2: Raw Image Changing, Segmentation Not Changing (TC Should be Lower) | 0.398 (0 Samples Larger than Case-1) ✓ | 0.509433 (277 Samples Larger than Case-1) ✗ |

FIG. 7D

| Cityscapes Val | Mean IoU |
|---|---|
| HRNet W18 Original | 76.146 |
| HRNet W18 Trained w/ TC | 76.529 |

FIG. 7E

CONSISTENCY MEASURE FOR IMAGE SEGMENTATION PROCESSES

CROSS-REFERENCE TO RELATED APPLICATIONS

The present application claims the benefit of U.S. Provisional Application No. 63/113,725, filed Nov. 13, 2020, entitled "CONSISTENCY MEASURE FOR IMAGE SEGMENTATION PROCESSES," which is hereby incorporated by reference in its entirety and for all purposes.

FIELD

The present disclosure generally relates to evaluating image segmentation processes. For example, some aspects of the present disclosure are related to determining temporal consistency measures for image segmentation processes.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

A common type of processing performed on a sequence of frames is image segmentation, which involves segmenting image and video frames into multiple portions. For example, image and video frames can be segmented into foreground and background portions. The segmented image and video frames can then be used for various applications. Applications that use image segmentation are numerous, including, for example, computer vision systems, extended reality systems, data compression, image segmentation, autonomous vehicle operation, among other applications. Effective techniques are needed for measuring the quality and/or performance of various image segmentation processes.

SUMMARY

Systems and techniques are described herein that can be implemented to determine consistency measures for image segmentation processes. According to at least one example, apparatuses are provided for determining consistency measures for image segmentation processes. An example apparatus can include at least one memory (one memory or multiple memory devices) and a processor or multiple processors (e.g., implemented in circuitry) coupled to the memory. The processor (or processors) is configured to: determine a first segmentation feature associated with a first segmentation mask of a first image frame of a plurality of image frames; determine a second segmentation feature associated with a second segmentation mask of a second image frame of the plurality of image frames, the second segmentation feature corresponding to the first segmentation feature; determine a first image feature of the first image frame that corresponds to the first segmentation feature; determine a second image feature of the second image frame that corresponds to the second segmentation feature; determine a first similarity measurement between the first image feature and the second image feature; and determine a temporal consistency measurement associated with the first image frame and the second image frame based at least in part on the first similarity measurement.

In another example, methods for determining consistency measures for image segmentation processes are provided. An example method can include determining a first segmentation feature associated with a first segmentation mask of a first image frame of a plurality of image frames. The method can also include determining a second segmentation feature associated with a second segmentation mask of a second image frame of the plurality of image frames, the second segmentation feature corresponding to the first segmentation feature. The method can include determining a first image feature of the first image frame that corresponds to the first segmentation feature. The method can also include determining a second image feature of the second image frame that corresponds to the second segmentation feature. The method can further include determining a first similarity measurement between the first image feature and the second image feature. The method can further include determining a temporal consistency measurement associated with the first image frame and the second image frame based at least in part on the first similarity measurement.

In another example, non-transitory computer-readable media are provided for determining consistency measures for image segmentation processes are provided. An example non-transitory computer-readable medium can store instructions that, when executed by one or more processors, cause the one or more processors to: determine a first segmentation feature associated with a first segmentation mask of a first image frame of a plurality of image frames; determine a second segmentation feature associated with a second segmentation mask of a second image frame of the plurality of image frames, the second segmentation feature corresponding to the first segmentation feature; determine a first image feature of the first image frame that corresponds to the first segmentation feature; determine a second image feature of the second image frame that corresponds to the second segmentation feature; determine a first similarity measurement between the first image feature and the second image feature; and determine a temporal consistency measurement associated with the first image frame and the second image frame based at least in part on the first similarity measurement.

In another example, an apparatus is provided including: means for determining a first segmentation feature associated with a first segmentation mask of a first image frame of a plurality of image frames; means for determining a second segmentation feature associated with a second segmentation mask of a second image frame of the plurality of image frames, the second segmentation feature corresponding to the first segmentation feature; means for determining a first image feature of the first image frame that corresponds to the first segmentation feature; means for determining a second image feature of the second image frame that corresponds to the second segmentation feature; means for determining a first similarity measurement between the first image feature and the second image feature; and means for determining a temporal consistency measurement associated with the first image frame and the second image frame based at least in part on the first similarity measurement.

In some aspects, the first image frame can be adjacent to the second image frame within the plurality of image frames. In other aspects, the plurality of image frames can include at least one intermediate image frame between the first image frame and the second image frame.

In some aspects, the method, apparatus, and computer-readable medium described above can include: determining that the second segmentation feature corresponds to the first segmentation feature based at least in part on: determining a plurality of segmentation features associated with the second segmentation mask, the plurality of segmentation features including the second segmentation feature; determining a plurality of similarity measurements between the first segmentation feature and the plurality of segmentation features associated with the second segmentation mask; and determining a highest similarity measurement of the plurality of similarity measurements corresponds to the second segmentation feature.

In some aspects, the method, apparatus, and computer-readable medium described above can include: determining segmentation features associated with the first segmentation mask and the second segmentation mask using a machine learning model trained for image segmentation. In some aspects, the machine learning model trained for image segmentation can be a neural network including a plurality of layers. In some examples, determining the segmentation features associated with the first segmentation mask and the second segmentation mask can include obtaining one or more feature maps output by a layer of the plurality of layers of the neural network.

In some aspects, the method, apparatus, and computer-readable medium described above can include: determining image features of the first image frame and image features of the second image frame using a machine learning model trained for feature extraction.

In some aspects, the method, apparatus, and computer-readable medium described above can include: determining a first location within the first image frame corresponding to the first segmentation feature; determining the first image feature of the first image frame based at least in part on the first location; determining a second location within the second image frame corresponding to the second segmentation feature; and determining the second image feature of the second image frame based at least in part on the second location.

In some aspects, determining the first similarity measurement between the first image feature and the second image feature can include comparing first image data corresponding to the first image feature and second image data corresponding to the second image feature.

In some aspects, determining the first similarity measurement between the first image feature and the second image feature can include comparing a first feature vector corresponding to the first image feature and a second feature vector corresponding to the second image feature. In some examples, the first similarity measurement between the first image feature and the second image feature can be a cosine similarity measurement.

In some aspects, the method, apparatus, and computer-readable medium described above can include: determining a third segmentation feature associated with the first segmentation mask; determining a fourth segmentation feature associated with the second segmentation mask, the fourth segmentation feature corresponding to the third segmentation feature; determining a third image feature of the first image frame corresponding to the third segmentation feature; determining a fourth image feature of the second image frame corresponding to the fourth segmentation feature; and determining a second similarity measurement between the third image feature and the fourth image feature. Some aspects can further include determining the temporal consistency measurement associated with the first image frame and the second image frame based at least in part on a representative value of the first similarity measurement and the second similarity measurement.

In some aspects, the method, apparatus, and computer-readable medium described above can include: generating, based on the temporal consistency measurement, a temporal consistency map associated with the first image frame and the second image frame, wherein the temporal consistency map stores the first similarity measurement in association with the first image feature and the second similarity measurement in association with the second image feature.

In some aspects, the method, apparatus, and computer-readable medium described above can include: determining a third segmentation feature associated with a third segmentation mask of a third image frame of the plurality of image frames, the third segmentation feature corresponding to the second segmentation feature; determining a third image feature of the third image frame corresponding to the third segmentation feature; and determining a second similarity measurement between the second image feature and the third image feature. Some aspects can further include determining a temporal consistency measurement associated with the first image frame and the third image frame based at least in part on the first similarity measurement and the second similarity measurement.

In some aspects, the method, apparatus, and computer-readable medium described above can include: generating the first segmentation mask and the second segmentation mask using a machine learning model trained for image segmentation; and determining a quality of the machine learning model based at least in part on the temporal consistency measurement, wherein a value of the temporal consistency measurement is associated with a quality of the machine learning model.

Some aspects can further include: generating the first segmentation mask and the second segmentation mask using a machine learning model being trained for image segmentation; and using the first similarity measurement as feedback for training the machine learning model for image segmentation.

In some aspects, the computing device and/or apparatus is, is part of, and/or includes a mobile device (e.g., a mobile telephone or so-called "smart phone" or other mobile device), a wearable device, an extended reality (XR) device (e.g., a virtual reality (VR) device, an augmented reality (AR) device, or a mixed reality (MR) device), a vehicle or a computing device or component of a vehicle (e.g., an autonomous vehicle), a robotics device or system or a computing device or component of a robotics device or system, a personal computer, a laptop computer, a server computer, a camera, or other device. In some aspects, the computing device, apparatuses, and/or vehicle includes a camera or multiple cameras for capturing one or more images. In some aspects, the computing device, apparatuses, and/or vehicle further includes a display for displaying one or more images, notifications, and/or other displayable data. In some aspects, the computing device, apparatuses, and/or vehicle described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 1 is a block diagram illustrating an example image segmentation system, in accordance with some examples;

FIG. 7A, FIG. 7B, FIG. 7C, FIG. 7D, and FIG. 7E illustrate example experimental data associated with evaluating image segmentation processes, in accordance with some examples;

DETAILED DESCRIPTION

Figure 2A:
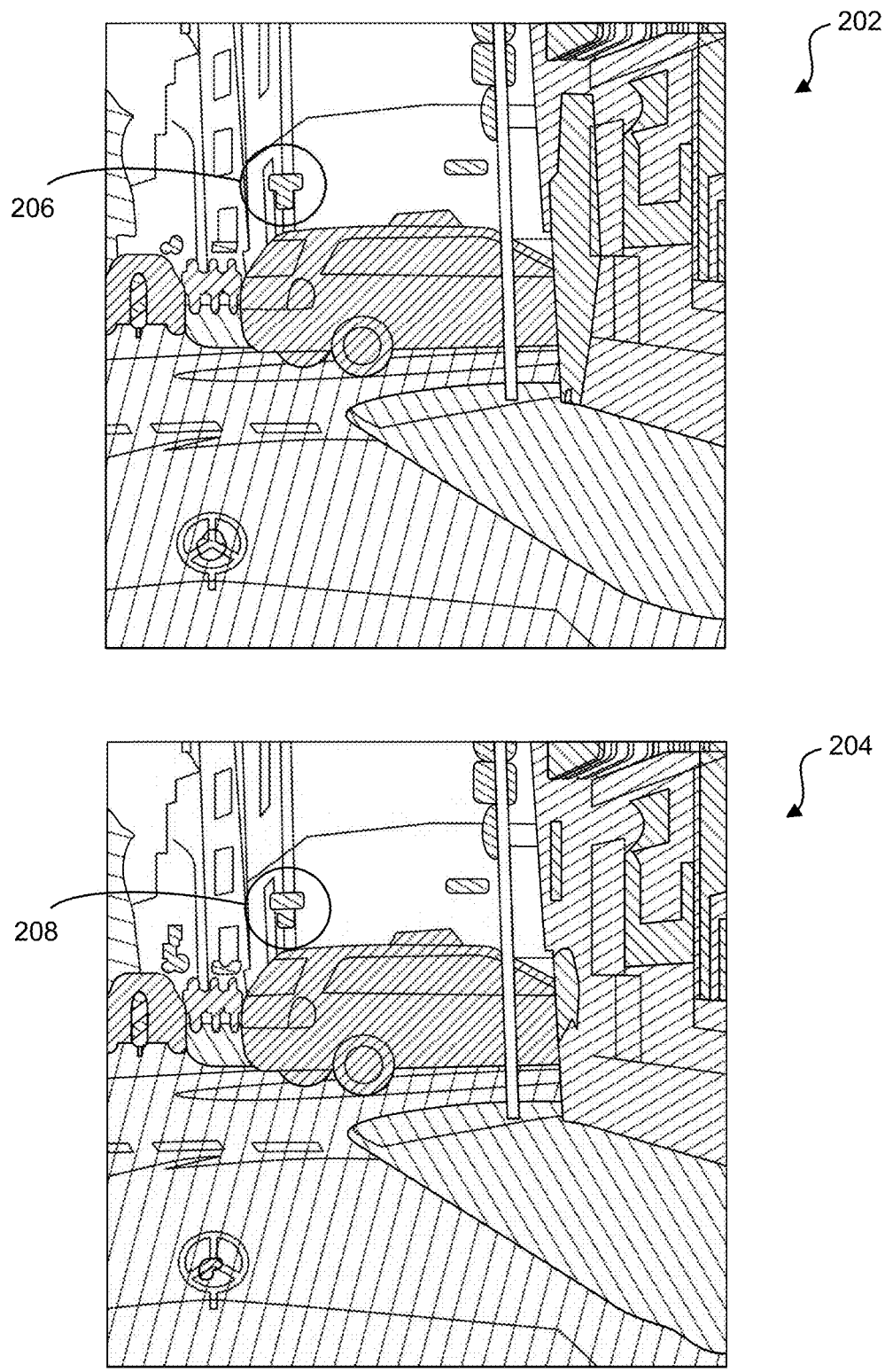
FIG. 2A and FIG. 2B are illustrations of example segmentation masks, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

Video semantic segmentation is a task of generating segmentation results for sequential image frames in videos. For example, a semantic segmentation network can be applied to all or a portion of the image frames of video. Some existing techniques for evaluating segmentation results can include comparing segmentation masks generated by a segmentation network against ground truth images (e.g., images known to be accurate) in a frame-by-frame manner. Such comparisons can be performed using mean intersection over union (IoU) measures, pixel-level accuracy measures, or other measures. In some cases, these techniques may be sufficient for image-level segmentation evaluation. However, when evaluating video segmentation, there can be additional concerns related to the consistency of segmentation changes over time. In general, there is a lack of reliable and robust measures for video segmentation temporal consistency.

One technique for evaluating video segmentation includes measuring segmentation temporal consistency only at the segmentation output level. However, such a measure may not refer to raw data changes, and may be not reliable when occlusion and/or large movements between image frames occur. Another technique includes measuring temporal stability based on computing the amount of high temporal frequencies in the outputs of a neural network (e.g., a convolutional neural network). However, such a measure only examines the network's outputs and does not measure whether changes in outputs reflect changes in the raw image frames. A further technique includes directly estimating motions (e.g., inconsistencies) using optical flow. However, estimating optical flow is not an easy task. In many real-world applications, obtaining accurate optical flow can be even more difficult than some semantic segmentation tasks. Moreover, errors committed by an optical flow estimation operation can lead to inaccurate and/or misleading temporal consistency measures.

Systems, apparatuses, methods, and computer-readable media (collectively referred to as "systems and techniques") are described herein for evaluating image segmentation (and video segmentation) processes. As will be explained in more detail below, these systems and techniques can evaluate image segmentation processes. For instance, given segmentation feature maps associated with two image frames (e.g., image frames t1 and t2), if a segmentation feature at location A of segmentation feature map t1 is similar to a segmentation feature at location B of segmentation feature map t2, then image data corresponding to locations A and B should be similar in the image (e.g., perceptual) feature space. For example, if the correlation between segmentation features at time t1 and time t2 "matches" the correlation between raw image features at time t1 and time t2, then segmentation between time t1 and time t2 is temporally consistent (e.g., with respect to the raw image domain). In this way, the disclosed systems and techniques can utilize "cross-frames" and "cross-features" correlation to measure the temporal consistency of image segmentation processes.

In one example, an image segmentation evaluation system can cross-reference a segmentation network's output features and perceptual features (e.g., image features) for consecutive image frames or close-by image frames (e.g., image frames separated by one, two, three, or other number of intermediate frames). For instance, the segmentation network's output features can be utilized as an instrument to generate an affinity matrix for features across space and time. The image segmentation evaluation system can use the affinity matrix to move perceptual features from an image frame with one timestamp to an image frame with another timestamp. The image segmentation evaluation system can then determine a similarity measure (e.g., a cosine similarity or distance or other similarity measure) between the moved perceptual features and the original perceptual features. This similarity measure can indicate how accurately the feature correlation at the segmentation level corresponds to the correlation at the perceptual feature level between the two image frames. In some cases, the image segmentation evaluation system can determine long-range temporal consistency by setting the two timestamps with a time sampling gap larger than 1 (e.g., corresponding to non-consecutive image frames). Further, the image segmentation evaluation system can extend the process of determining a two-frame temporal consistency measure to determining multiple-frame temporal consistency measures.

In some cases, the image segmentation evaluation system can be unsupervised (e.g., trained without using supervision based on labeled data). For instance, the image segmentation evaluation system may not require the availability of ground truth annotations and/or third party optical flow estimation networks. In some examples, the temporal consistency measures determined by the image segmentation evaluation system can be utilized as a training loss for improving segmentation consistency and/or accuracy (e.g., by utilizing unlabeled image frames that are adjacent or nearby labeled image frames).

FIG. 1 is a diagram illustrating an example of an image segmentation system 102. The image segmentation system 102 includes various components, including a segmentation engine 104, a motion determination engine 109, and a pixel adjustment engine 108. A rendering engine 110 is also shown as being in communication with the image segmentation system 102. In some implementations, the rendering engine 110 can be part of the image segmentation system 102. The components of the image segmentation system 102 and the rendering engine 110 can include electronic circuits or other electronic hardware, which can include one or more programmable electronic circuits (e.g., microprocessors, graphics processing units (GPUs), digital signal processors (DSPs), central processing units (CPUs), neural processing engines (NPEs) or neural processing units (NPUs), or other suitable electronic circuits), computer software, firmware, or any combination thereof, to perform the various operations described herein. The segmentation system 102 can leverage the architectures of the CPU, DSP, GPU, and the NPU or NPE to dynamically determine the best means to run a neural network, while optimizing metrics such as latency, throughput, battery, memory, CPU, among others. In one illustrative example, the operations of the segmentation engine 104 can be implemented using a NPE that can run one or more neural networks, a GPU, and/or a DSP. In another example, the operations of the motion determination engine 109 can be implemented using a CPU. In another example, the operations of the rendering engine 110 can be implemented using a GPU. While the image segmentation system 102 is shown to include certain components, one of ordinary skill will appreciate that the image segmentation system 102 can include more or fewer components than those shown in FIG. 1. For example, the image segmentation system 102 may also include, in some instances, one or more memory (e.g., RAM, ROM, cache, buffer, and/or the like) and/or processing devices that are not shown in FIG. 1.

Multiple frames (e.g., frames 103) can be processed by the components of the image segmentation system 102. A frame can include a video frame of a video sequence or a still image of a set of consecutively captured still images. In one illustrative example, a set of consecutively captured still images can be captured and displayed to the user as a preview of what is in the field-of-view of the camera, which can help the user decide when to capture an image for storage. In another illustrative example, a set of consecutively captured still images can be captured using a burst mode or other similar mode that captures multiple consecutive images.

A frame can be a red-green-blue (RGB) frame having red, green, and blue color components per pixel, a luma, chroma-red, chroma-blue (YCbCr) frame or YUV frame having a luma component and two chroma (color) components, such as chroma-red and chroma-blue, per pixel, any other suitable type of color or monochrome picture, thermal images with temperature values, range or depth images with depth values, optical flow images with motion deltas (deltax, deltay), multi-spectral and hyper-spectral images with color band values, any combination thereof, and/or other types of frames or images. In some cases, the frames can include multi-view image frames (e.g., image frames from a stereo camera setup that generates corresponding left and right image frames captured at the same time). In some examples, the image segmentation process can be performed in response to one or more image frames being captured by a camera or a computing device that includes a camera (e.g., a mobile device, an extended reality (XR) device such as a head-mounted display or XR glasses, a vehicle or computing device or system of a vehicle, or other computing device). In an illustrative example, the image segmentation process can be performed in order to track the movement of objects across the one or more image frames. In another illustrative example, the image segmentation process can be invoked in response to selection of a shutter button, one or more graphical icons that cause a frame to be captured with a visual effect, and/or other selection option of a camera or computing device. The visual effect can include the background pixels of the frame being blurred out, being blacked out, being changed to a different color, being replaced with a different background, having an adjusted lighting and/or color characteristic, and/or applied with any other suitable effect. In another example, the visual effect can include modifying the foreground pixels (e.g., changing the lighting, blurring, or the like) of the output frame or replacing the foreground pixels with a different object, such as a computer-generated object, an augmented reality (AR) object, or other suitable object.

The frame source 101 from which the frames 103 are received can include one or more image capture devices and/or one or more video capture devices (e.g., a digital camera, a digital video camera, a phone with a camera, a tablet with a camera, or other suitable capture device), an image and/or video storage device, an image and/or video archive containing stored images, an image and/or video server or content provider providing image and/or video data, an image and/or video feed interface receiving images from a video server or content provider, a computer graphics system for generating computer graphics image and/or video data, a combination of such sources, or other source of image frame content. In some cases, multiple frame sources can provide frames to the image segmentation system 102.

The image segmentation system 102 (and rendering engine 110) can be part of a computing device or multiple computing devices. In some cases, the computing device (or devices) that includes the image segmentation system 102 can also include one or more wireless transceivers for wireless communications and/or a display for displaying one or more images. In some examples, the computing device including the image segmentation system 102 can be an electronic device, such as a camera (e.g., a digital camera, an IP camera, a video camera, a camera phone, a video phone, or other suitable capture device), a mobile or stationary device (e.g., a telephone handset such as a smartphone, cellular telephone, or the like), an extended reality (XR) device (e.g., a virtual reality (VR) device, an augmented reality (AR) device, a mixed reality (MR) device, etc.) such as a head-mounted display or XR glasses, a vehicle or computing device or system of a vehicle, a robotics device, a desktop computer, a laptop or notebook computer, a tablet computer, a set-top box, a television, a display device, a digital media player, a video gaming console, a video streaming device, or any other suitable electronic device. In some implementations, the image segmentation system 102 and the frame source 101 can be part of the same computing device. For example, in some cases, a camera, phone, tablet, and/or other device with a frame or image source (e.g., a camera, storage, or the like) can include an integrated image segmentation system (e.g., the image segmentation system 102). In some implementations, the image segmentation system 102 and the frame source 101 can be part of separate computing devices. In one illustrative example, the frame source 101 can include one or more cameras, and the computing device including the image segmentation system 102 can include a mobile or stationary telephone handset, a desktop computer, a laptop or notebook computer, a tablet computer, or other computing device.

In some examples, the image segmentation process performed by the image segmentation system 102 can be performed using a single camera system of a computing device. In other examples, the image segmentation performed by the image segmentation system 102 can be performed using a dual camera system of a computing device. In some cases, more than two cameras can be used in a camera system for performing the image segmentation process.

Figure 7A:
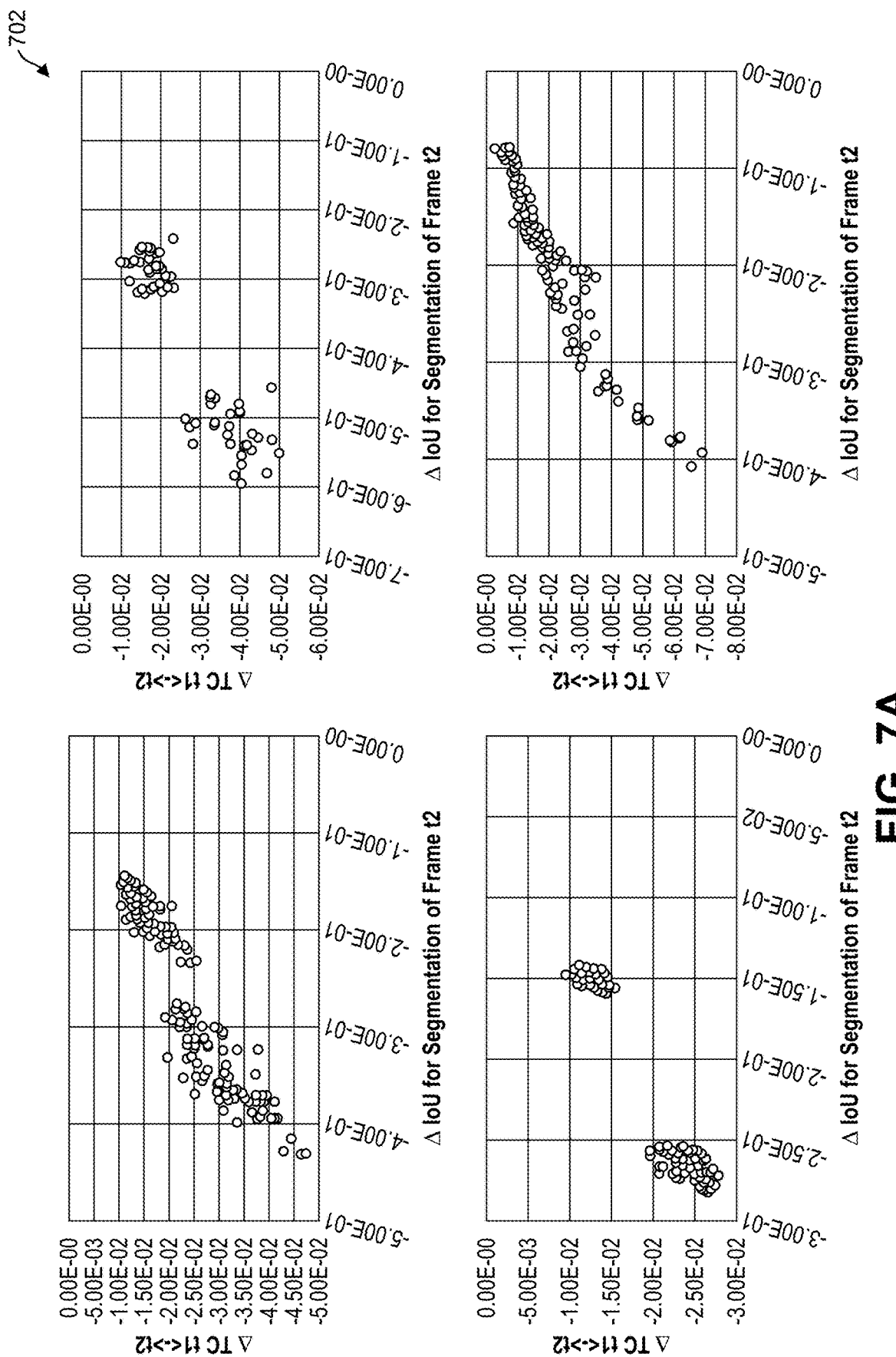

The segmentation engine 104 of the image segmentation system 102 can process a frame using image segmentation (also referred to as semantic segmentation) to generate a segmentation mask (also referred to as a segmentation map). For example, a segmentation frame M from a sequence of frames (e.g., frames 103) can be processed by the segmentation engine 104 in order to determine a segmentation mask for the segmentation frame M. A segmentation frame, as used herein, is any frame for which image segmentation is performed. In some examples, a segmentation mask can indicate which pixels in the frame are foreground pixels and which pixels are background pixels. For instance, the segmentation mask can include a first value (e.g., a value of 255, 1, or other suitable value) for pixels that belong to the person (the foreground) and a second value (e.g., a value of 0) for pixels that belong to the background. The first value (e.g., a 255) can correspond to a white color, in which case pixels corresponding to the object of interest are white. In such cases, the second value (e.g., a 0) can correspond to a black color, in which case pixels corresponding to the background are black. In some cases, a segmentation mask can include indications of other pixels (other than foreground and background pixels), such as pixels belonging to transition regions between foreground and background pixels, pixels belonging to classified objects other than an object of interest (e.g., a person) when a classification neural network is used to segment the frame, or the like. FIG. 7B is an example of a segmentation mask generated using an image shown in FIG. 7A. As described in more detail below, a trained deep neural network can be used to perform the image segmentation. In some cases, the neural network can include a classification network that is trained to identify multiple classes of objects, where one of the object classes is an object of interest (e.g., a person, a bicycle, a vehicle, or other suitable object of interest). In such cases, the segmentation mask can include a value for each pixel indicating to which class each pixel belongs.

As noted above, the segmentation engine 104 can perform a deep learning based image segmentation (using a trained deep neural network) in some cases. Illustrative examples of deep neural networks are described below with respect to FIG. 9 and FIG. 10 The complex nature of deep learning based image segmentation can cause the segmentation process to consume large amounts of computing resources and power, and can cause latencies and performance issues to occur.

Various techniques exist for evaluating image segmentation processes. According to one technique, an image segmentation evaluation system can directly compare segmentation outputs from a segmentation network with ground truth annotations for a set of testing image frames. This technique can utilize mean IoUs (e.g., a metric for region-based evaluation). In addition to region-based evaluation, mean IoUs can also be used to evaluate image segmentation accuracy with a focus on boundaries. Further, mean intersection-over-union (IoU) measures can be extended for volume-based precision and recall in order to evaluate to higher-dimensional data (e.g., three-dimensional (3D) or video segmentation results). However, techniques that utilize mean IoUs can have several shortcomings and/or disadvantages. For example, dense and/or accurate ground truth annotation can be expensive (e.g., resource-intensive) to acquire, especially for video data. Further, it may not be practical or feasible to accurately annotate all available image frames, resulting in the need to select a set of image frames to form a validation set (e.g., a test set) for annotation. This selection process can introduce bias into the evaluation results. Moreover, existing evaluation techniques may not explicitly address temporal consistency. For example, it is possible for a temporally inconsistent segmentation process and a temporally consistent segmentation process to yield the same (or similar) mean IoU.

Another technique for evaluating image segmentation processes can include shape and/or contour matching between image frames. For example, this technique can include propagating an object mask of an initial image frame to following image frames. In one example, a measure of the temporal consistency between object masks of two image frames can be determined based on matching shape descriptors associated with the image frames. A low cost of matching can indicate a stable (e.g., consistent) image segmentation process over time. This technique can be based on the assumption that shape and/or object mask changes are stable and continuous. Thus, because an object's shape can change drastically in cases where occlusion or a change of viewpoint occurs, this technique can fail to accurately reflect temporal stability (e.g., due to the technique evaluating only output shapes without referring back to raw images). Another technique can include comparing the total amount of temporal changes (e.g., high frequencies) in the outputs of a segmentation network with the total amount of temporal changes (e.g., high frequencies) of ground truths. In this technique, outputs with less change can indicate better temporal consistency. However, this measure may not address whether the output stability accurately reflects changes in raw image frames. For example, it is possible for a segmentation network to generate static outputs for videos with motion. Although inaccurate, these static outputs could be considered stable (e.g., even more stable than ground truths).

Another technique for evaluating image segmentation processes involves optical flow estimation. In this technique, segmentation temporal consistency can be defined as a fraction of tracks that are consistently labeled. Tracks can be obtained using frame-to-frame optical flow estimation. In some cases, a high fraction of matching tracks can indicate a high temporal consistency. A related technique can include estimating optical flow between two raw image frames (e.g., image frame t−1 and image frame t) and using the estimated optical flow to warp a segmentation mask from t−1 to t. A mean IoU measure can then be computed between the warped segmentation and a segmentation generated by a segmentation network at time t. A high mean IoU measure can indicate a high segmentation temporal consistency between image frame t−1 and image frame t. In some cases, using optical flow estimation for evaluating image segmentation processes can have various shortcomings and/or disadvantages. For example, estimating accurate optical flow for real-world data (e.g., not simulated data) can be a difficult task (e.g., more difficult than segmentation tasks). Further, accurate optical flow estimation can be time-consuming, thereby prohibiting real-time temporal consistency measurements in applications where temporal consistency might be crucial (e.g., autonomous driving). Moreover, relying on a parametric model (e.g., an optical flow estimation network) to evaluate another highly parametric model (e.g., a segmentation network) can be problematic. For example, without guarantees of high-quality optical flow estimation, a temporal consistency measure that depends on warping based on the optical flow estimation can be inaccurate or misleading. However, some examples of the disclosed systems and techniques can utilize warped segmentation masks based on optical flow estimation to determine temporal consistency measurements.

Figure 2B:
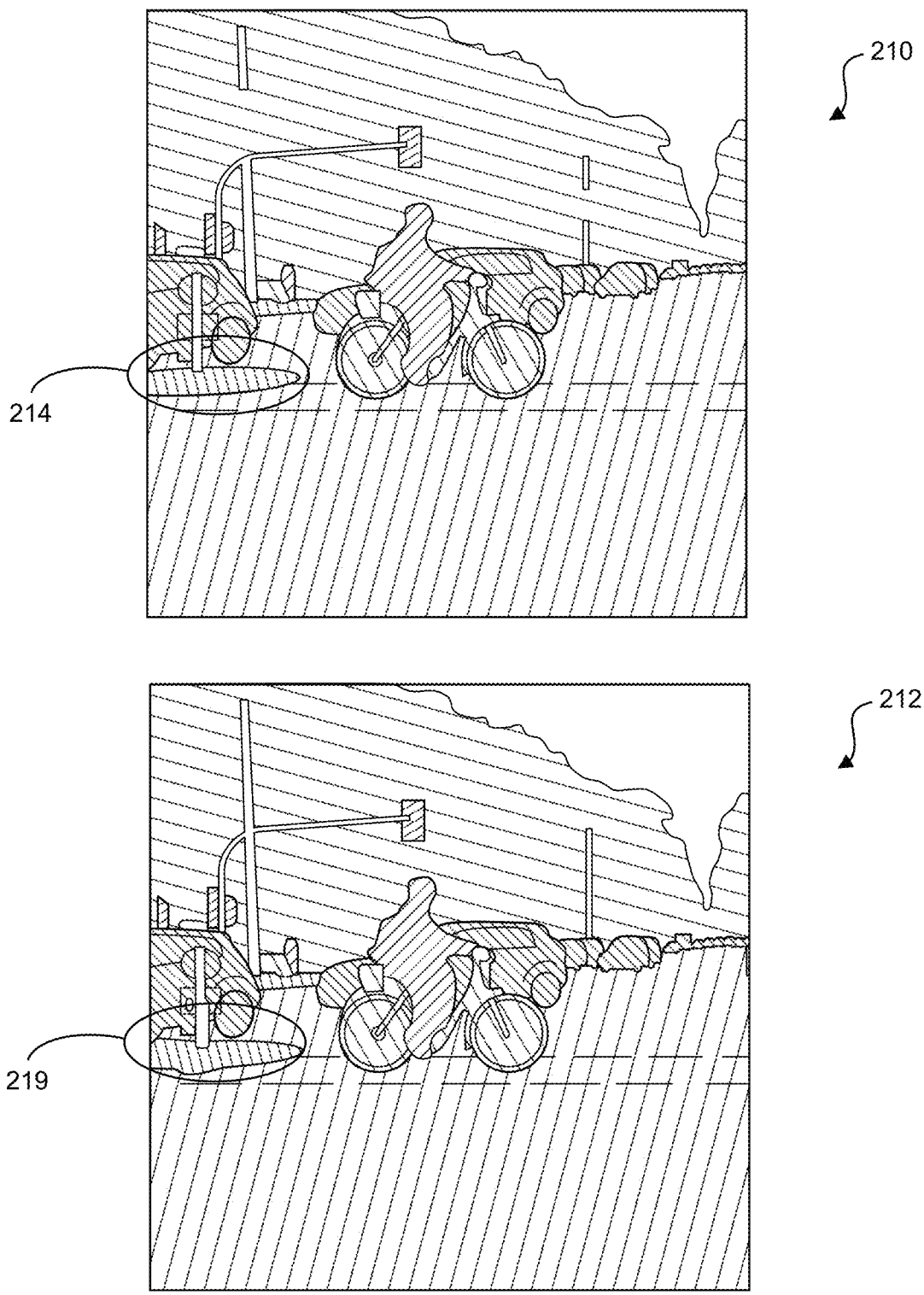

FIG. 2A and FIG. 2B provide illustrations of example segmentation masks overlaid on image frames. These illustrations represent example temporal inconsistencies that can occur within segmentation masks across multiple image frames. FIG. 2A shows an image frame 202 and an image frame 204. In one example, the image frame 202 and the image frame 204 can represent adjacent (or nearby) image frames in a series of image frames. The image frame 202 illustrates a segment 206, which represents a portion of a segmentation mask for the image frame 202 corresponding to one feature (e.g., one object) within the image frame 202. The image frame 204 illustrates a segment 206, which represents a corresponding portion of a segmentation mask for the image frame 204. As shown, the shape of the segment 206 is different than the shape of the segment 208. This difference is an example of a temporal inconsistency. For instance, the segment 206 and the segment 208 should have the same (or approximately the same) shape and size, as the feature corresponding to the segments 206 and 208 has not moved between the image frames 202 and 204. This temporal inconsistency can result in an undesirable visual output (e.g., a "flicker") or other error when the segmentation masks are used in various applications (e.g., computer vision applications, extended reality applications, autonomous vehicle applications, etc.). FIG. 2B illustrates another example of a temporal inconsistency. For example, an image frame 210 includes a segment 214 and an image frame 212 (e.g., an adjacent image frame) includes a corresponding segment 219. As shown, the segment 219 includes an inaccuracy not exhibited by the segment 214.

Figure 3A:
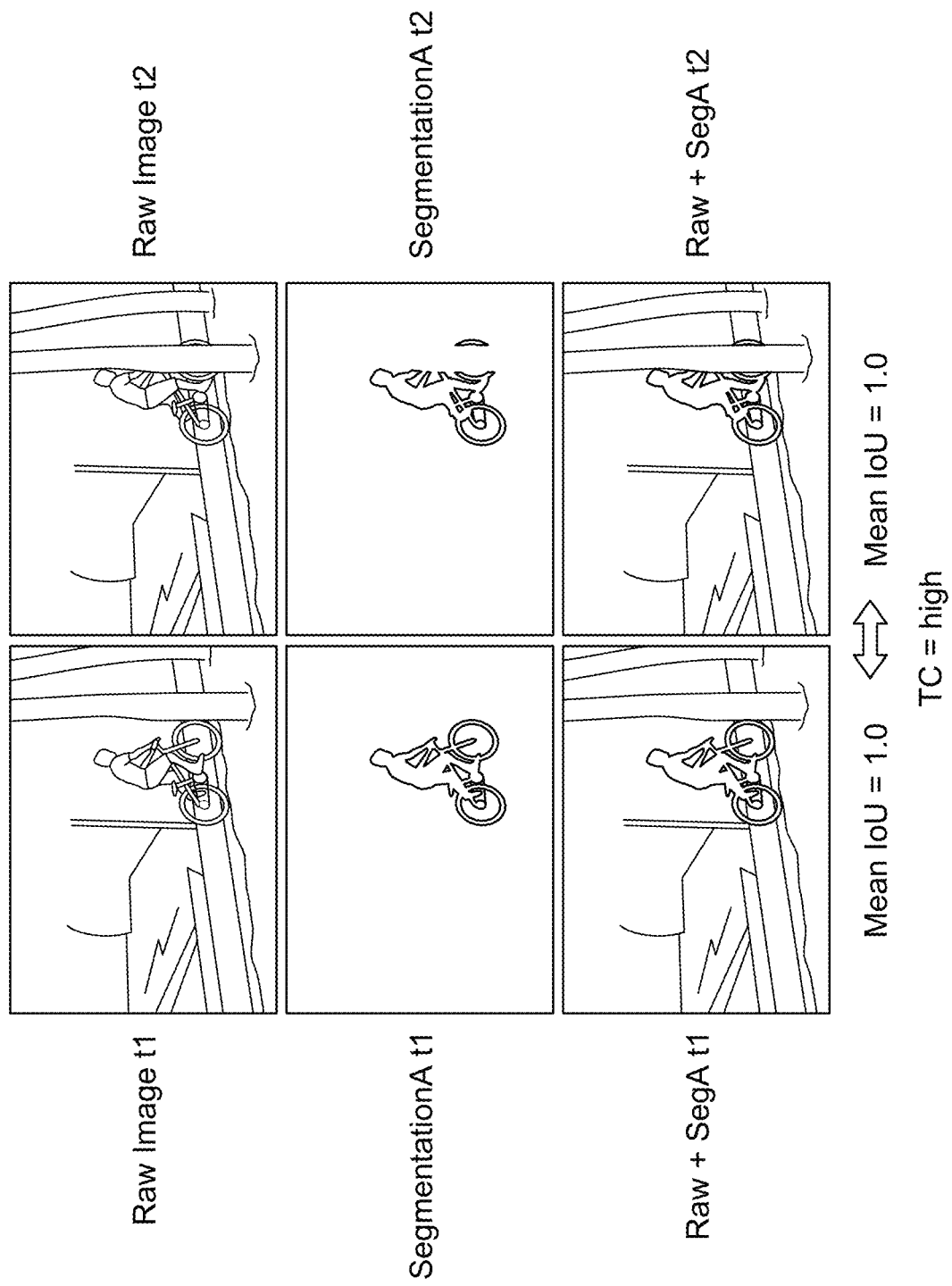
FIG. 3A, FIG. 3B, FIG. 3C, and FIG. 3D are other illustrations of example segmentation masks, in accordance with some examples.
Figure 3B:
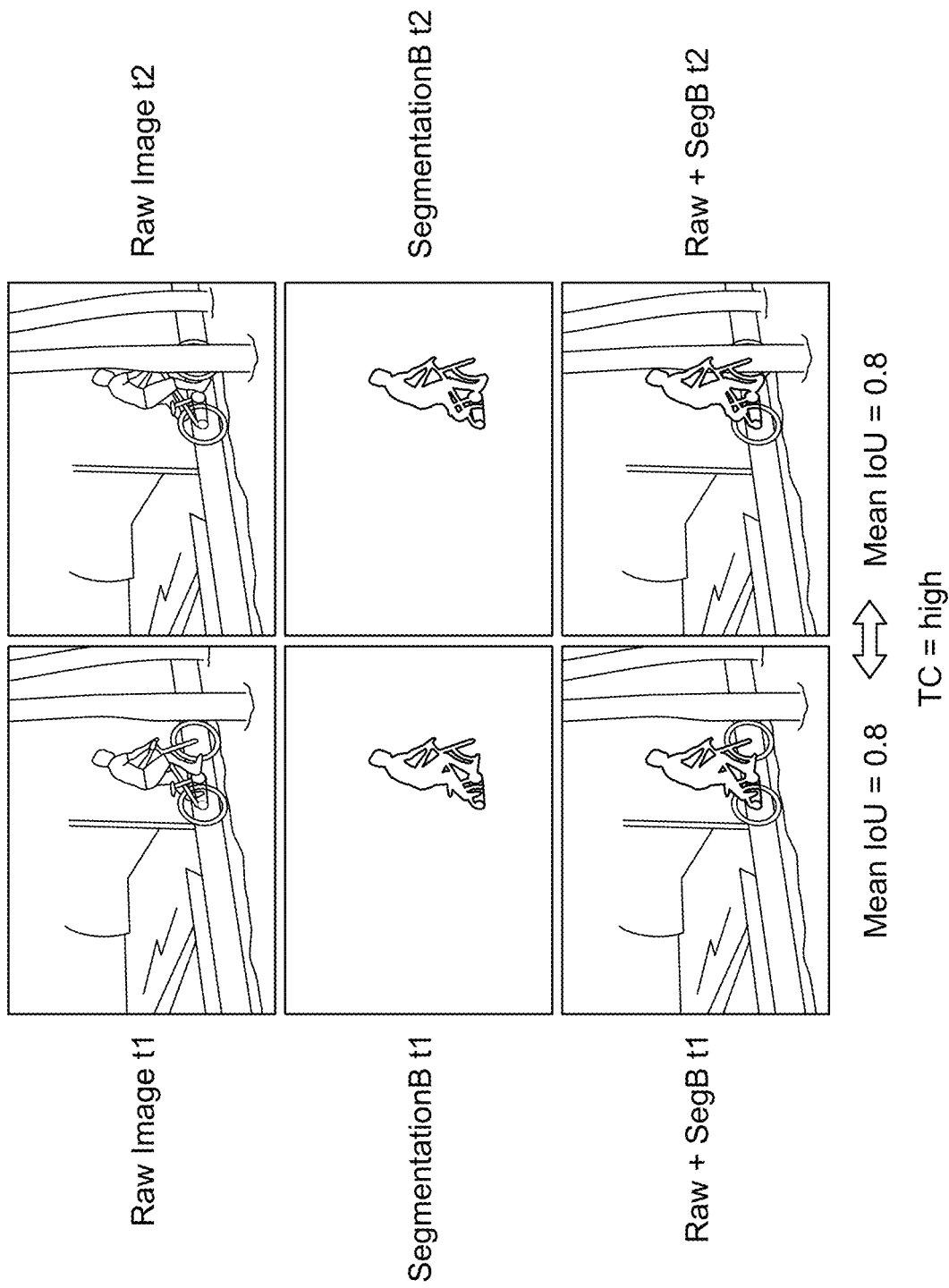
Figure 3C:
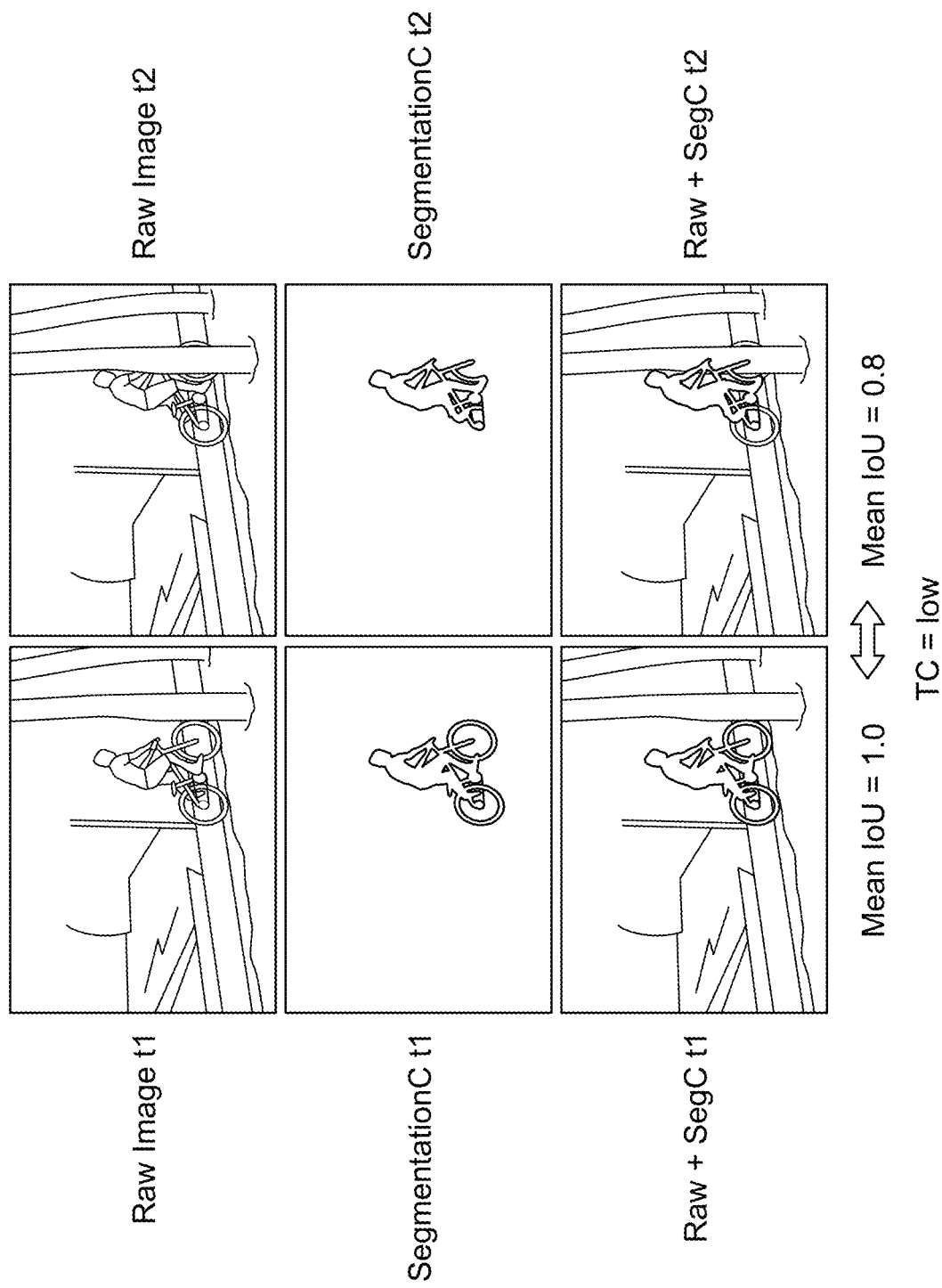
Figure 3D:
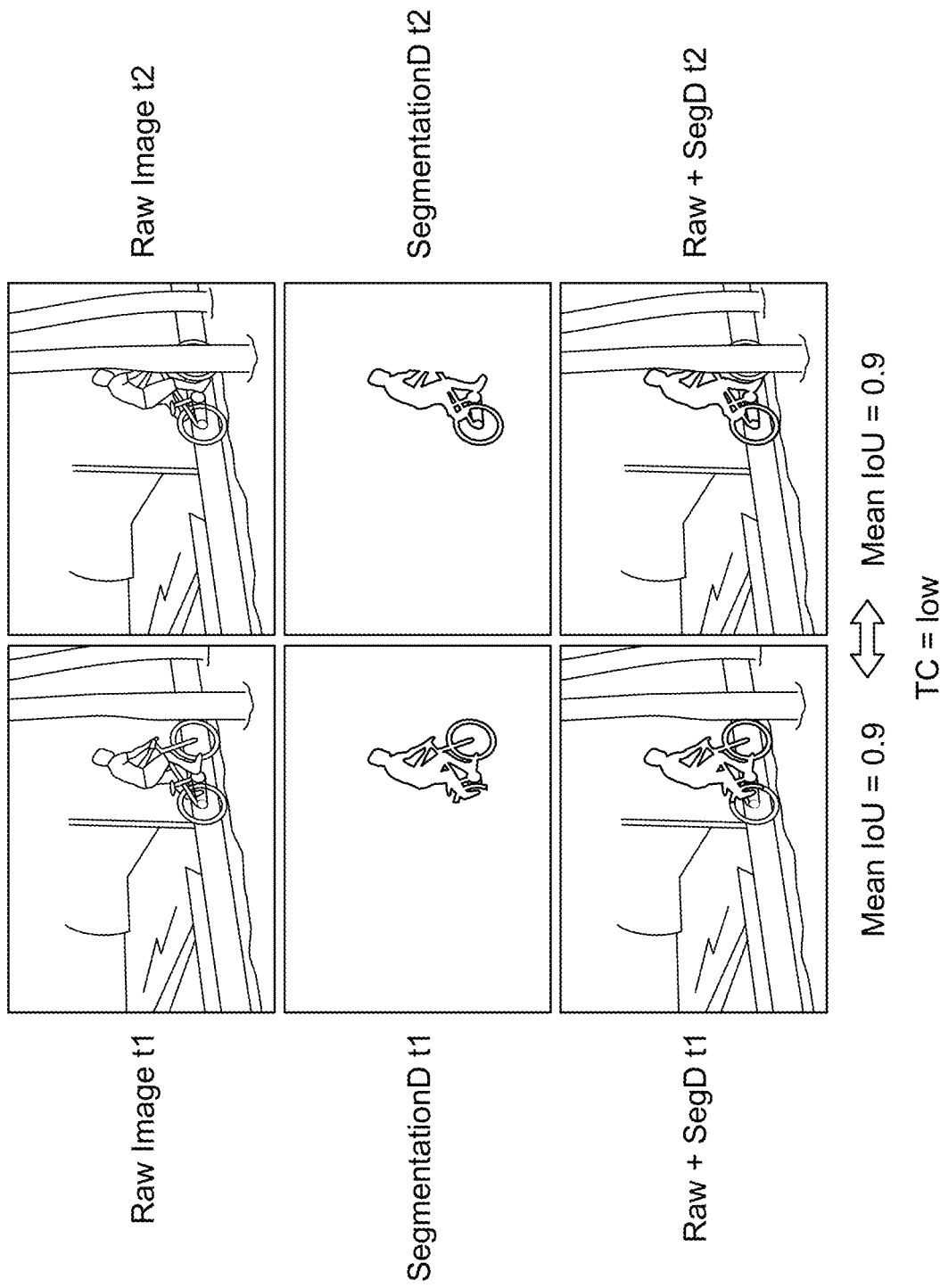

FIG. 3A, FIG. 3B, FIG. 3C, and FIG. 3D provide examples of evaluating image segmentation processes. These examples can illustrate disadvantages of evaluating segmentation processes using mean IoU measures. These figures each show the same two image frames (corresponding to a time t1 and a time t2), segmentation masks for the two image frames, and the segmentation masks overlaid on the image frames. The image segmentation processes used to generate the segmentation masks in each figure are different. In the example of FIG. 3A, the mean IoU for both segmentation masks is high (e.g., a value of 1.0 on a scale of 0.0-1.0). Further, the temporal consistency (TC) is also high due both to the segmentation masks being highly accurate. In the example of FIG. 3B, the mean IoU for both segmentation masks is lower (e.g., 0.8). However, both segmentation masks have errors in the same (or similar) locations. For example, as shown, both segmentation masks fail to include the wheels of the bicycle. Thus, the temporal consistency of the segmentation masks is high. In FIG. 3C, the mean IoU of the segmentation mask corresponding to the first image frame is high (e.g., 1.0) and the mean IoU of the segmentation mask corresponding to the second image frame is lower (e.g., 0.8), indicating that there errors in the second segmentation mask not exhibited by the first segmentation mask. Thus, the temporal consistency of the segmentation masks is low. In FIG. 3A, the mean IoU of both segmentation masks is the same (e.g., 0.9). However, the temporal consistency for these segmentation masks is low due to the segmentation masks having errors associated with different features. For example, as shown, the first segmentation mask does not include the back wheel of the bicycle, while the second segmentation mask does. Accordingly, in some cases, mean IoU may not be an accurate or reliable metric for evaluating image segmentation processes. For example, unless the mean IoUs associated with two or more frames are all high (e.g., near 1), or there is a clear difference in mean IoU between two image frames, temporal consistency cannot be inferred simply based on per-frame mean IoU values. Thus, segmentation temporal consistency may not correspond to segmentation per-frame accuracy.

Figure 4:
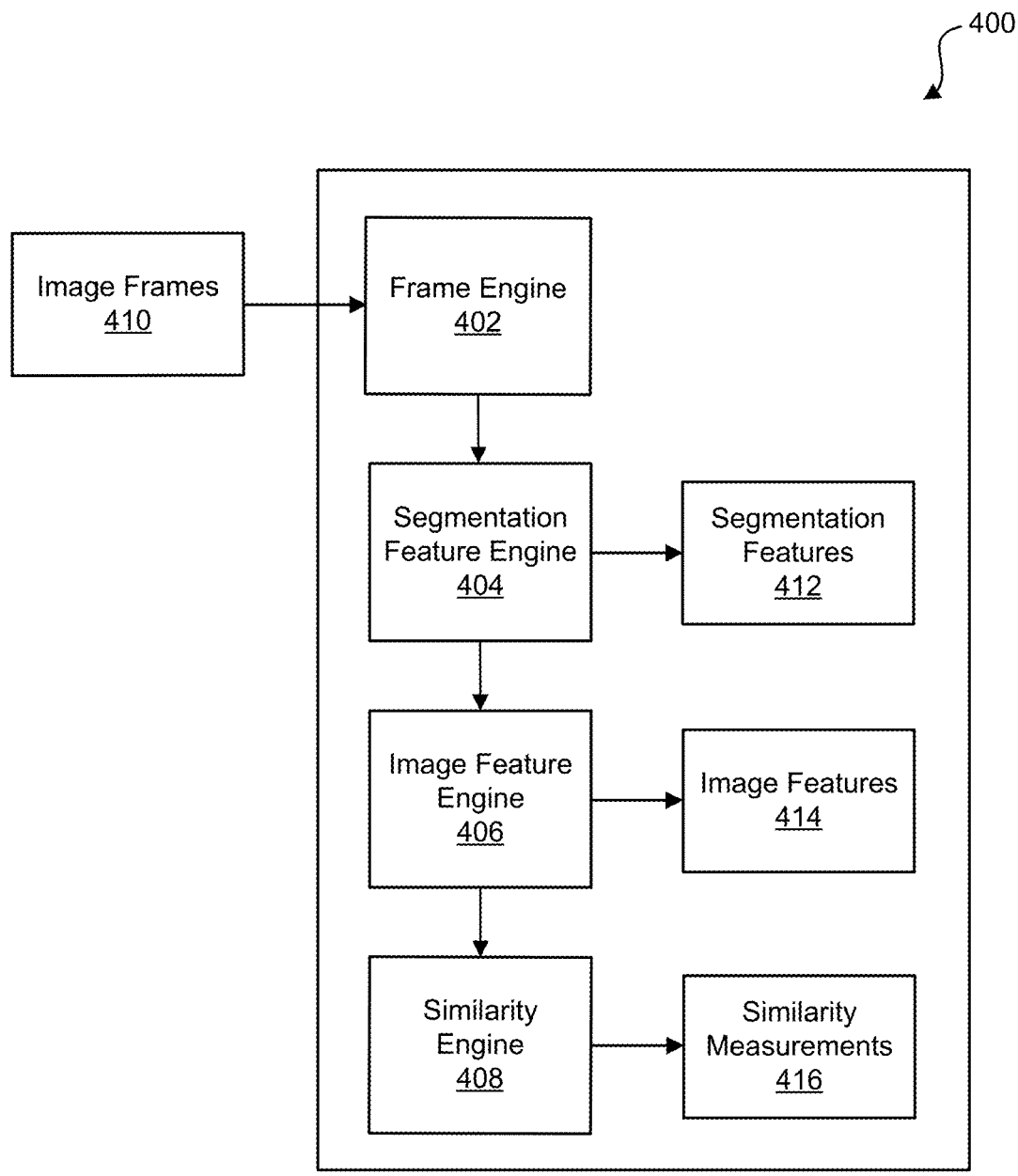
FIG. 4 is a block diagram illustrating an example image segmentation evaluation system, in accordance with some examples.

FIG. 4 is a diagram illustrating an example of an image segmentation evaluation system 400. In some cases, all or a portion of the image segmentation evaluation system 400 can be included within and/or in communication with the image segmentation system 102 of FIG. 1. For example, the image segmentation evaluation system 400 can evaluate the output frames 112 (or other image segmentation outputs) of the image segmentation system 102. In another example, the image segmentation evaluation system 400 can be configured to train an image segmentation process (e.g., a neural network) implemented by the image segmentation system 102.

As shown in FIG. 4, the image segmentation evaluation system 400 can include one or more engines, such as a frame engine 402, a segmentation feature engine 404, an image feature engine 406, and a similarity engine 408. In one example, the frame engine 402 can receive one or more image or video frames (e.g., image frames 410). The image frames 410 can correspond to one or more of the frames 103 shown in FIG. 1. In some cases, the frame engine 402 can receive the image frames 410 as the image frames 410 are captured by an image capture device and/or a video capture device (e.g., a digital camera, a digital video camera, a phone with a camera, a tablet with a camera, or other suitable capture device). The frame engine 402 can pass all or a portion of the image frames 410 to the segmentation feature engine 404 and/or the image feature engine 406.

In some examples, the segmentation feature engine 404 can determine segmentation features 412 of the image frames 410. As used herein, the term "segmentation feature" can refer to a feature associated with a segmentation mask. For example, a segmentation feature can include a feature vector determined based at least in part on an image segmentation process. In one example, a segmentation feature can correspond to a feature vector output by a layer of a neural network (e.g., a deep neural network with a plurality of layers) trained for image segmentation. In an illustrative example, the final layer of the neural network can be a fully connected layer and/or a layer that implements an "argmax" function (as will be explained in more detail below). In this example, the segmentation feature engine 404 can determine segmentation features associated with an image frame based on output of the second-to-last layer of the neural network. In some cases, feature vectors generated by this layer can include feature information associated with various types of features. For example, the feature vectors can include feature information associated with low-level features (e.g., corners and/or edges of objects), mid-level features (e.g., boundaries of objects, shapes, etc), and/or high-level features (e.g., objects). In some examples, segmentation features associated with an image frame (e.g., each segmentation feature associated with the image frame) can, collectively, correspond to a segmentation feature map.

In some examples, the image feature engine 406 can determine image features 414 of the image frames 410. As used herein, the term "image feature" (also "perceptual feature") can refer to any feature associated with an image frame. In one example, an image feature can correspond to a feature vector determined based at least in a feature extraction algorithm performed on raw image data. In another example, an image feature can correspond to and/or include raw image data. In some cases, the image feature engine 406 can determine the image features 414 using a neural network trained for feature extraction, such as an ImageNet network and/or a ResNet network (e.g., ResNet18, ResNet101, etc.). In one example, the image feature engine 406 can obtain the neural network from a repository of pre-trained neural networks (e.g., the PyTorch model zoo). In some cases, the size (e.g., resolution) of the image features 414 may be different than the size of the segmentation features 412. In these cases, the image feature engine 406 can resize the image features 414 to match the size of the segmentation features 412. In some examples, image features associated with an image frame (e.g., each image feature associated with the image frame) can, collectively, correspond to an image feature map.

In some cases, the similarity engine 408 can determine similarity measurements 416 based at least in part on the segmentation features 412 and the image features 414. The similarity measurements 416 can include one or more temporal consistency measurements indicating the level of temporal consistency between segmentation masks associated with two or more image frames. In one example, the similarity measurements 416 can include a plurality of temporal consistency measurements corresponding to individual features of an image frame. In another example, the similarity measurements 416 can include an overall (e.g., single) temporal consistency measurement representative of each feature of an image frame. The similarity engine 408 can determine the similarity measurements 416 in various ways. In one example, the segmentation feature engine 404 can determine segmentation feature maps for two (or more) image frames, and the image feature engine 406 can determine image feature maps for the two (or more) image frames. The image frames can be adjacent (e.g., consecutive) image frames in a series of image frames, or the image frames can be separated by one or more intermediate image frames. Based on the segmentation feature maps and the image feature maps, the similarity engine 408 can determine corresponding feature pairs within the maps. For instance, for each segmentation feature of one segmentation feature map, the similarity engine 408 can determine a most-similar segmentation feature of another segmentation feature map. Further, for each image feature of one image feature map, the similarity engine 408 can determine a most-similar image feature of another image feature map. The similarity engine 408 can then determine a temporal consistency measurement associated with the two corresponding image frames based on similarity measurements between the segmentation feature pairs and/or similarities between the image feature pairs.

Figure 5A:
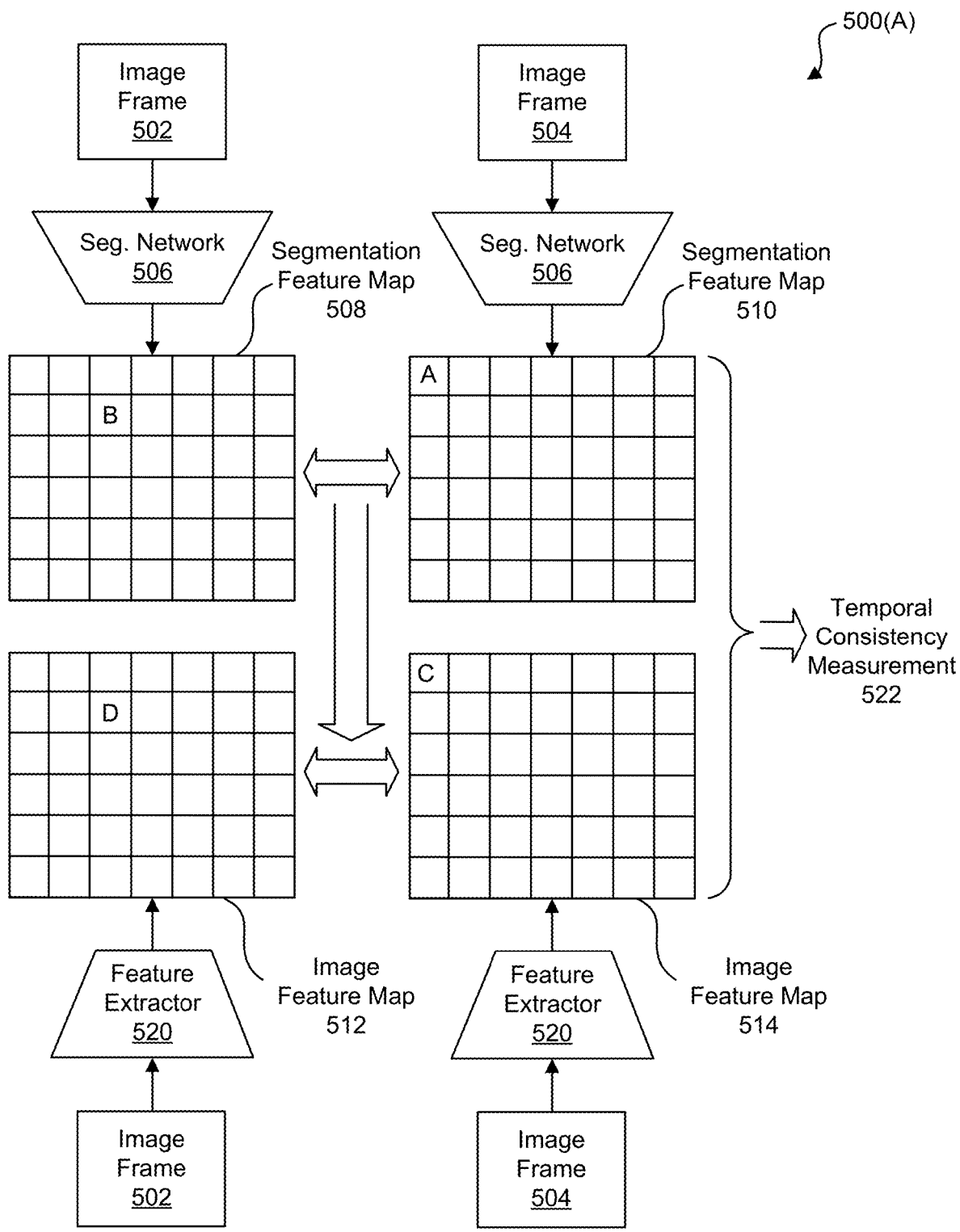
FIG. 5A and FIG. 5B are block diagrams illustrating example image segmentation evaluation systems, in accordance with some examples.
Figure 5B:
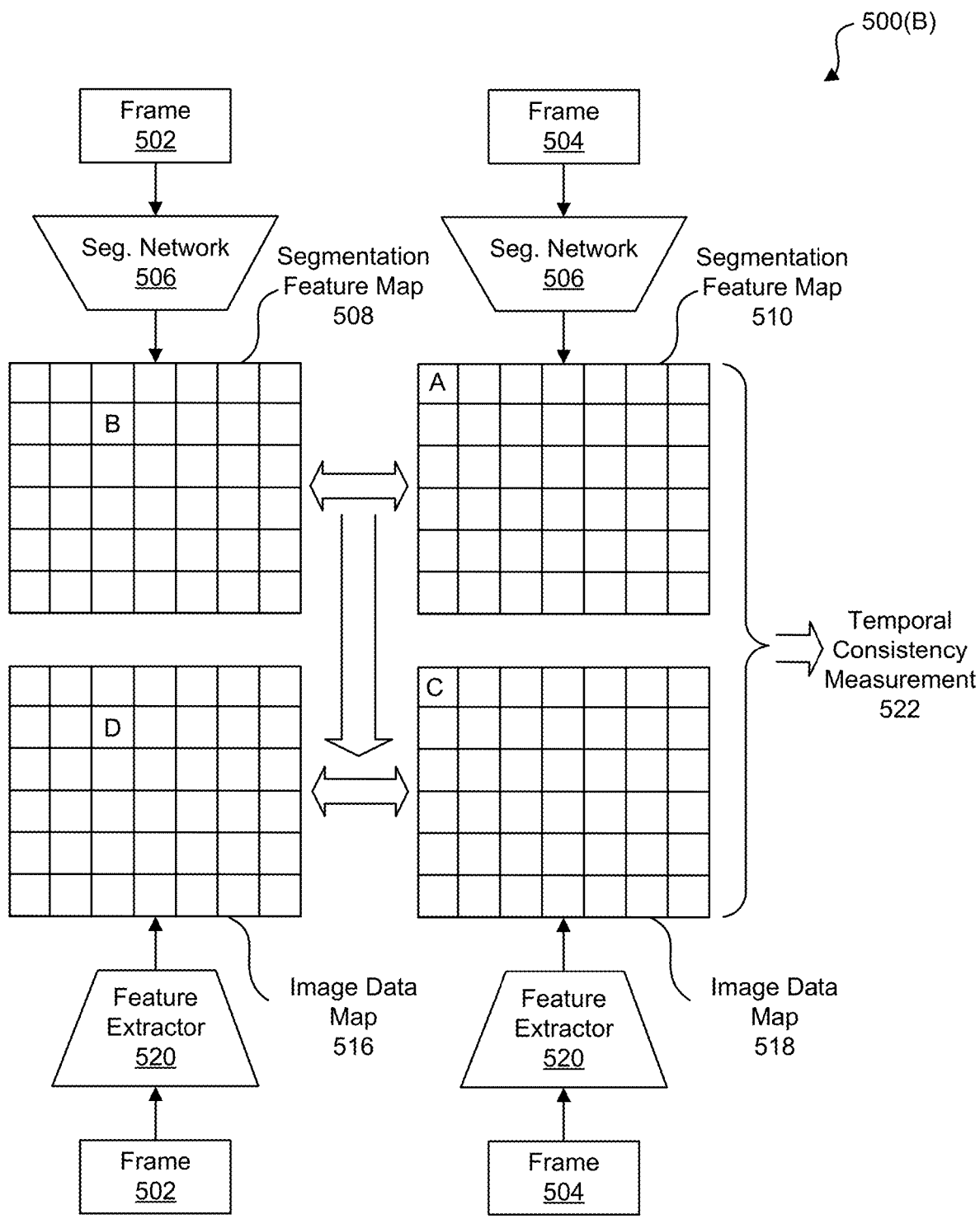

FIG. 5A and FIG. 5B illustrate example implementations 500(A) and 500(B), respectively, of the image segmentation evaluation system 400 of FIG. 4. In implementation 500(A), the image segmentation evaluation system 400 can receive an image frame 502 and an image frame 504. The image segmentation evaluation system 400 can input the image frames 502 and 504 to a segmentation network 506 (e.g., a neural network trained for image segmentation). As shown, the segmentation network 506 can generate a segmentation feature map 508 associated with the image frame 502 and a segmentation feature map 510 associated with the image frame 504. The image segmentation evaluation system 400 can also input the image frames 502 and 504 to a feature extractor 520 (e.g., a neural network trained for feature extraction). As shown, the feature extractor 520 can generate an image feature map 512 associated with the image frame 502 and an image feature map 514 associated with the image frame 504. In implementation 500(A), the image feature maps 512 and 514 can include feature vector associated with each feature extracted by the feature extractor 520.

In some cases, each location (e.g., box) within the segmentation feature maps 508 and 510 and the image feature maps 512 and 514 can correspond to one feature (e.g., one feature vector). In one example, the image segmentation evaluation system 400 can determine affinities (e.g., correlations or similarities) between segmentation feature vectors of the segmentation feature map 510 and segmentation feature vectors of the segmentation feature map 508. For instance, for each segmentation feature of the segmentation feature map 510, the image segmentation evaluation system 400 can determine a corresponding segmentation feature (e.g., a most similar segmentation feature) of the segmentation feature map 508. In one example, the image segmentation evaluation system 400 can represent corresponding segmentation feature pairs with an affinity matrix. For instance, the image segmentation evaluation system 400 can generate an affinity matrix using an "argmax" operation that determines, from a set of available arguments, an argument resulting in a maximum value of a target function. In this example, the set of available arguments can correspond to segmentation feature vectors of the segmentation feature map 508 and the target function can correspond to a similarity function that outputs a similarity measurement between two segmentation feature vectors. In an illustrative example, given the segmentation feature map 508 and a segmentation feature vector corresponding to a segmentation feature A shown in FIG. 5A, the argmax operation can identify which segmentation feature of the segmentation feature map 508 is most similar to the segmentation feature A. In one example, the similarity function can correspond to a cosine similarity measure, which is widely used in applications involving recognition (e.g., face recognition) and deep neural networks. The similarity function can be any other similarity function, such as an inversed norm-2 distance measure. To generate a complete affinity matrix, the image segmentation evaluation system 400 can repeat the argmax operation for each segmentation feature vector of the segmentation feature map 510. For example, in general terms, for every location (x, y) in a segmentation feature map $y_{x,y}^{t2}$ associated with a frame t2, the segmentation feature engine 404 can determine a corresponding feature at a location (i*, j*) of a segmentation feature map $y_{i,j}^{t1}$ associated with a frame t1 using the equation $$i^*, j^* = \underset{i,j}{\operatorname{argmax}}\, \theta(y_{i,j}^{t1}, y_{x,y}^{t2}),$$

where $\theta(\ast\bullet\ast)$ is a similarity function.

In some cases, the image segmentation evaluation system 400 can determine corresponding segmentation features based at least in part on a shape encoder trained for encoding segmentation masks generated by a segmentation network. For instance, the image segmentation evaluation system 400 can use a shape encoder to determine a particular (e.g., important) shape, object, or other structure within a segmentation feature map associated with one image frame, which can facilitate determining a corresponding shape, object, or structure within a segmentation feature map associated with another image frame.

In an illustrative example, the image segmentation evaluation system 400 can determine that the segmentation feature A of the segmentation feature map 510 corresponds to a segmentation feature B of the segmentation feature map 508. In some cases, the image segmentation evaluation system 400 can determine a temporal consistency measurement 522 associated with the segmentation features A and B based at least in part on a similarity measurement between corresponding image features of the image feature maps 512 and 514. For example, the image segmentation evaluation system 400 can determine that the segmentation feature A corresponds to an image feature C of the image feature map 514. In an illustrative example, the image segmentation evaluation system 400 can determine the corresponding image feature C based on a location (e.g., pixel coordinates) of the segmentation feature A within the segmentation feature map 510. For instance, the image segmentation evaluation system 400 can determine the image feature C by identifying an image feature at a corresponding location. As shown, the image segmentation evaluation system 400 can also determine that the segmentation feature B of the segmentation feature map 508 corresponds to the image feature D of the image feature map 512.

In some cases, the image segmentation evaluation system 400 can determine the temporal consistency measurement 522 based at least in part on a similarity measurement between image feature vectors associated with the image features C and D. The similarity measurement can be a cosine similarity measurement or any other suitable similarity measurement. In an illustrative example, the temporal consistency measurement 522 can correspond directly to the similarity measurement between the image feature vectors. In other examples, the image segmentation evaluation system 400 can determine the temporal consistency measurement 522 based on one or more additional similarity measurements. For example, the image segmentation evaluation system 400 can determine a temporal consistency measurement associated with the segmentation features A and B. In general terms, for a location (i*,j*) of a segmentation feature map $y_{i,j}^{t1}$ associated with a frame t1, the image segmentation evaluation system 400 can determine a temporal consistency measurement for a corresponding location (x,y) in a segmentation feature map $y_{x,y}^{t2}$ associated with a frame t2 using the equation $\tau_{x,y}^{t1\rightarrow t2} = \theta(y_{i^*,j^*}^{t1}, y_{x,y}^{t2})$, where $\theta(\ast\bullet\ast)$ is a similarity function. This equation can give a temporal consistency measurement for the direction t1→t2. For a temporal consistency measurement for the direction t2→t1, corresponding segmentation features can be determined using the equation $$x^*, y^* = \underset{x,y}{\operatorname{argmax}}\, \theta(y_{x,y}^{t2}, y_{i,j}^{t1})$$

and the temporal consistency measurement can be given by the equation $\tau_{i,j}^{t2\rightarrow t1} = \theta(y_{x^*,y^*}^{t2}, y_{i,j}^{t1})$. In some cases, the image segmentation evaluation system 400 can determine a single bi-directional temporal consistency measurement using the equation $$T_{unnormalized}^{t2\leftrightarrow t1} = \min\left(\frac{\sum_{i=1}^{m}\sum_{j=1}^{n}\tau_{i,j}^{t2\rightarrow t1}}{m\times n}, \frac{\sum_{x=1}^{m}\sum_{y=1}^{n}\tau_{x,y}^{t2\rightarrow t1}}{m\times n}\right),$$

where m and n are the dimensions of the segmentation feature maps. The single bi-directional temporal consistency measurement can be a representative (e.g., overall) value of the temporal consistency measurements for each feature within a pair of image frames.

In some cases, the image segmentation evaluation system 400 can determine temporal consistency measurements based at least in part on level of continuity associated with consecutive or close-by image frames. For example, the continuity between two or more image frames can vary based on factors including frame rate, filming conditions (e.g., lighting or other conditions), captured scenarios, objects in view, among other factors. To determine the level of continuity between two image frames, the image segmentation evaluation system 400 can, for every location (x,y) of an image feature map $\rho^{t1}$ associated with an image frame t1, find the most similar image feature of an image feature map $\rho^{t2}$ associated with an image frame t2 using a similarity function. A temporal consistency measurement between a pair of most-similar image features in the direction t1→t2 can be given by $$\zeta_{x,y}^{t1\rightarrow t2} = \underset{i,j}{\max}\, \theta(\rho_{i,j}^{t1}, \rho_{x,y}^{t2}).$$

Similarly, a temporal consistency measurement between a pair of most-similar image features in the direction t2→t1 can be given by $$\zeta_{i,j}^{t2\rightarrow t1} = \underset{x,y}{\max}\, \theta(\rho_{x,y}^{t2}, \rho_{i,j}^{t1}).$$

Further, the image segmentation evaluation system 400 can determine a single bi-directional temporal consistency measurement using the equation $$Z^{t2\leftrightarrow t1} = \min\left(\frac{\sum_{i=1}^{m}\sum_{j=1}^{n}\zeta_{i,j}^{t2\to t1}}{m\times n}, \frac{\sum_{x=1}^{m}\sum_{y=1}^{n}\zeta_{x,y}^{t2\to t1}}{m\times n}\right).$$

In some cases, the image segmentation evaluation system 400 can determine the temporal consistency measurement 522 based on both a bi-directional temporal consistency measurement associated with the segmentation feature maps 508 and 510 and a bi-directional temporal consistency measurement associated with the image feature maps 512 and 514. For example, the image segmentation evaluation system 400 can normalize both (unnormalized) bi-directional measurements using the equation:

$$T_{normalized}^{t2\leftrightarrow t1} = \min\left(\frac{\sum_{i=1}^{m}\sum_{j=1}^{n}\tau_{i,j}^{t2\to t1}}{\sum_{i=1}^{m}\sum_{j=1}^{n}\zeta_{i,j}^{t2\to t1}}, \frac{\sum_{x=1}^{m}\sum_{y=1}^{n}\tau^{t1\to t2}}{\sum_{x=1}^{m}\sum_{y=1}^{n}\zeta_{x,y}^{t1\to t2}}\right).$$

This normalized equation can facilitate comparing temporal consistency at the segmentation level and temporal consistency at the raw image (e.g., perceptual) level.

In some cases, the image segmentation evaluation system 400 can generate a temporal consistency map that associates individual temporal consistency measurements with respective features (e.g., based on single-direction temporal consistency measurements). Additionally or alternatively, the image segmentation evaluation system 400 can determine an overall temporal consistency measurement (e.g., based on bi-directional temporal consistency measurements). The image segmentation evaluation system 400 can determine the temporal consistency measurement 522 using any variation or combination of the temporal consistency measurements described above, as well as any additional or alternatively temporal consistency measurements.

Further, the image segmentation evaluation system 400 can extend the disclosed temporal consistency measurement techniques from two image frames to more than two image frames. For example, the temporal consistency measurement for a series of image frames $x_i$ for i=1, . . . , K, can be defined as:

$$T_{normalized}^{\{1,2,...,K\}} = \frac{\sum_{a=1}^{K-1}\sum_{b=l+1}^{K} T_{normalized}^{a\leftrightarrow b}}{(K\times(K-1)/2)}.$$

In some cases, a pair of image frames with a time gap larger than w may not be considered as a valid pair. In these cases, the temporal consistency measurement for a series of image frames including an invalid pair can be defined as:

$$T_{normalized}^{\{1,2,...,K\}} = \frac{\sum_{a=1}^{K-1}\sum_{b=l+1}^{min(K,a+2)} T_{normalized}^{a\leftrightarrow b}}{(w\times(K-1))}.$$

Further, the image segmentation evaluation system 400 can determine temporal consistency measurements for non-consecutive image frames. For example, to determine long-range temporal consistency, the time a of one frame and the time t2 of another frame can be set such that |t1−t2|>1.

Referring to FIG. 5B, the implementation 500(B) can be generally similar to the implementation 500(A) of FIG. 5A. For example, in both implementations 500(A) and 500(B), the image segmentation evaluation system 400 can determine the segmentation feature maps 508 and 510 based on the image frames 502 and 504. However, in implementation 500(B), the feature extractor 520 can generate an image data map 516 associated with the image frame 502 and an image data map 518 associated with the image frame 504. In some cases, the image data maps 516 and 518 can include raw image data (e.g., rather than feature vectors). In implementation 500(B), the image segmentation evaluation system 400 can determine the temporal consistency measurement 522 based at least in part on similarity measurements between image data corresponding to image features.

Temporal consistency measurements can be utilized in various ways and for various applications. In one example, temporal consistency measurements can be used to select a best (e.g., a highest quality) or most suitable segmentation network. For instance, the image segmentation evaluation system 400 can determine temporal consistency measurements associated with segmentation masks generated by a group of segmentation networks. The image segmentation evaluation system 400 can select and/or recommend a particular segmentation network that has the best (e.g., highest quality) temporal consistency measurements. In another example, the image segmentation evaluation system 400 can evaluate the performance of a segmentation network in real-time (or almost real-time). For instance, the image segmentation evaluation system 400 can detect when a segmentation network is not performing with adequate or sufficient accuracy. In an illustrative example, an autonomous vehicle can utilize a segmentation network for navigation and/or safety. In this example, if the image segmentation evaluation system 400 detects that the segmentation network is performing below a certain standard or threshold for temporal consistency, the image segmentation evaluation system 400 can return control of the vehicle to a person in the driver's seat.

Figure 6A:
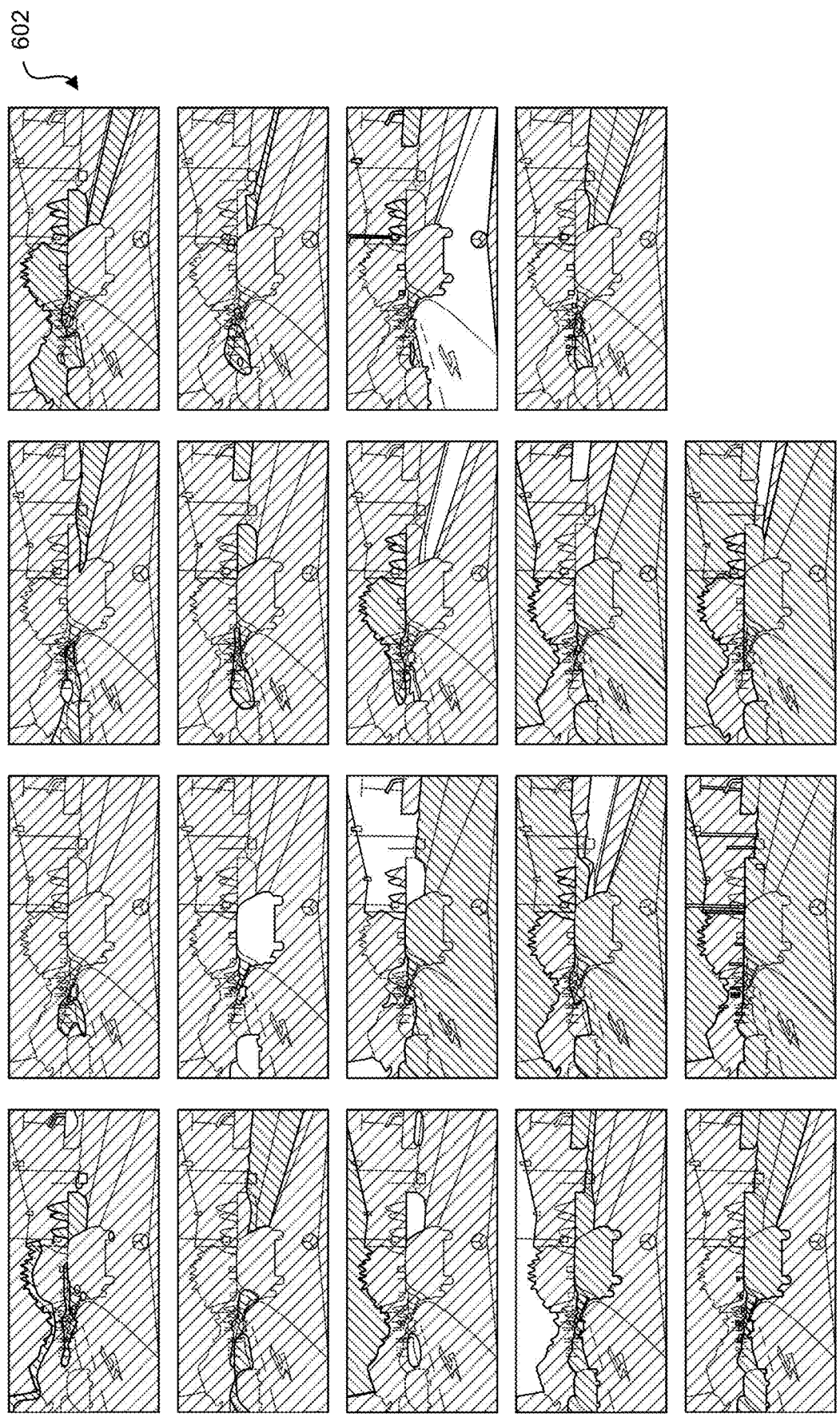
FIG. 6A and FIG. 6B are images illustrating examples of segmentation feature maps, in accordance with some examples.
Figure 6B:
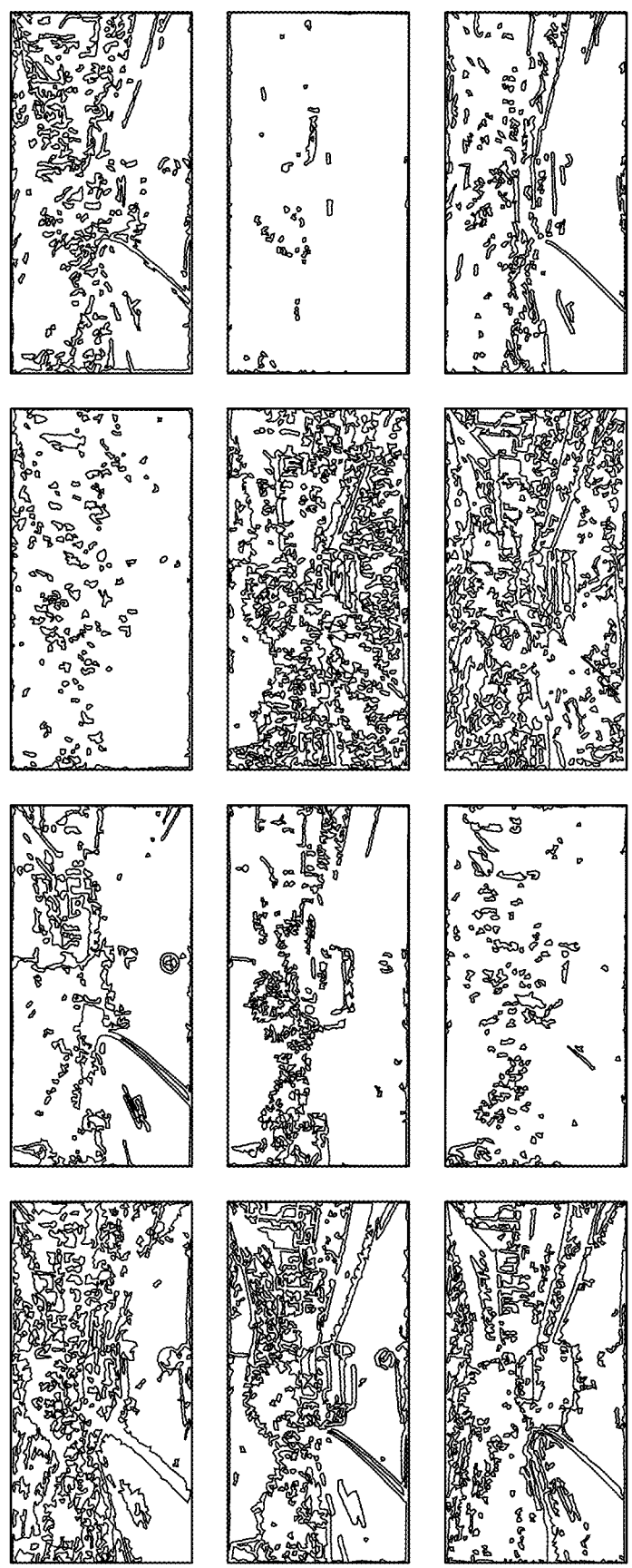

FIG. 6A and FIG. 6B provide illustrations of example segmentation feature maps. For example, segmentation feature map data 602 of FIG. 6A shows segmentation feature map data corresponding to 19 channels of a segmentation network. Each channel can correspond to one class category. Further, segmentation feature map data 604 of FIG. 6B shows segmentation feature map data corresponding to 12 channels (e.g., out of 128 channels) of a segmentation network. Each channel can correspond to one class category.

FIG. 7A illustrates example experimental data 702 quantifying the effectiveness of the disclosed techniques for evaluating image segmentation processes. The experimental data 702 can be obtained using the DAVIS dataset, which includes dense and high-quality ground truth annotation for each image frame in the dataset. In the experimental setup used to obtain the experimental data 702, for two consecutive or close-by image frames, if segmentation on one image frame (e.g., image frame t1) has high accuracy (e.g., a mean IoU of 1.0), then the mean IoU for an image segmentation mask for the next image frame (e.g., image frame t2) is the segmentation temporal consistency between image frame t1 and image frame t2. The experimental data 702 shows changes in temporal consistency measurements for various changes in mean IoU for image frame t2 (e.g., given ideal image segmentation for image frame t1). Each graph of the experimental data 702 corresponds to a different mean IoU for image frame t2.

FIG. 7B illustrates example experimental data 704 indicating temporal consistency measurements for various situations involving changes in image data and/or segmentation masks across multiple frames. FIG. 7C illustrates example experimental data 706 indicating temporal consistency measurements associated with segmentation masks that use temporal consistency measurements and segmentation networks that do not use temporal consistency measurements. FIG. 7D illustrates example experimental data 708 indicating temporal consistency measurements associated with segmentation masks generated by segmentation networks that use optical flow estimation and segmentation networks that use temporal consistency measurements. FIG. 7E illustrates example experimental data 710 indicating temporal consistency measurements associated with segmentation masks generated by segmentation networks trained using temporal consistency measurements and segmentation networks trained without temporal consistency measurements.

In some cases, the disclosed systems and techniques for evaluating image segmentation processes can be used for improving training of neural networks for image segmentation. For instance, during the process of training a segmentation network, temporal consistency measurements can be used as loss values. Using temporal consistency measurements in this way can improve segmentation networks trained using unlabeled data. For example, some existing segmentation datasets (e.g., Cityscapes, CamVid, etc.) contain large amounts of unlabeled data, with only a small portion of the image frames being annotated (e.g., for ground truth). Given a set of image frames $x_i^L$ and a corresponding annotation map $y_i$, for i=1 N, a typical supervised training setup may be to train a segmentation network using these image and annotation pairs. This training setup can be improved using temporal consistency measurements and a set of unlabeled images $x_i^U$, each with consecutive time stamps of 4. The following PyTorch code provides an example of computing temporal consistency training loss using the temporal consistency measurements described above:

cos=nn.CosineSimilarity(dim=1)
softmax0=nn.Softmax(dim=0)
softmax1=nn.Softmax(dim=1)
normalize=nn.functional.normalize(p=2,dim=1)
A=normalize(seg(xL_i))
B=normalize(seg(xU_i))
C=normalize(resnet(xL_i))
D=normalize(resnet(xU_i))
B=B.permute(1,0)
Obtain feature correlation:
corr=torch.matmul(A,B)
corr0=softmax1(corr/0.0001)
D_hat=torch.matmul(D.permute(1, 0),corr0)
TC for one direction:
TC0=torch.mean(cos(D_hat.permute(1,0),D))
corr1=softmax1(corr/0.0001)
C_hat=torch.matmul(corr1,D.permute(1, 0))
TC for the other direction:
TC1=torch.mean(cos(C_hat, C))
Combine the TCs from the two directions
loss=1.0−(TC0+TC1)/2

The above temporal consistency loss can be applied together with the segmentation cross entropy loss, resulting in a loss $L=L_{ce}(seg(x_i^L), seg(x_i^L), resnet(x_i^U), resnet(x_i^L))$.

Figure 8:
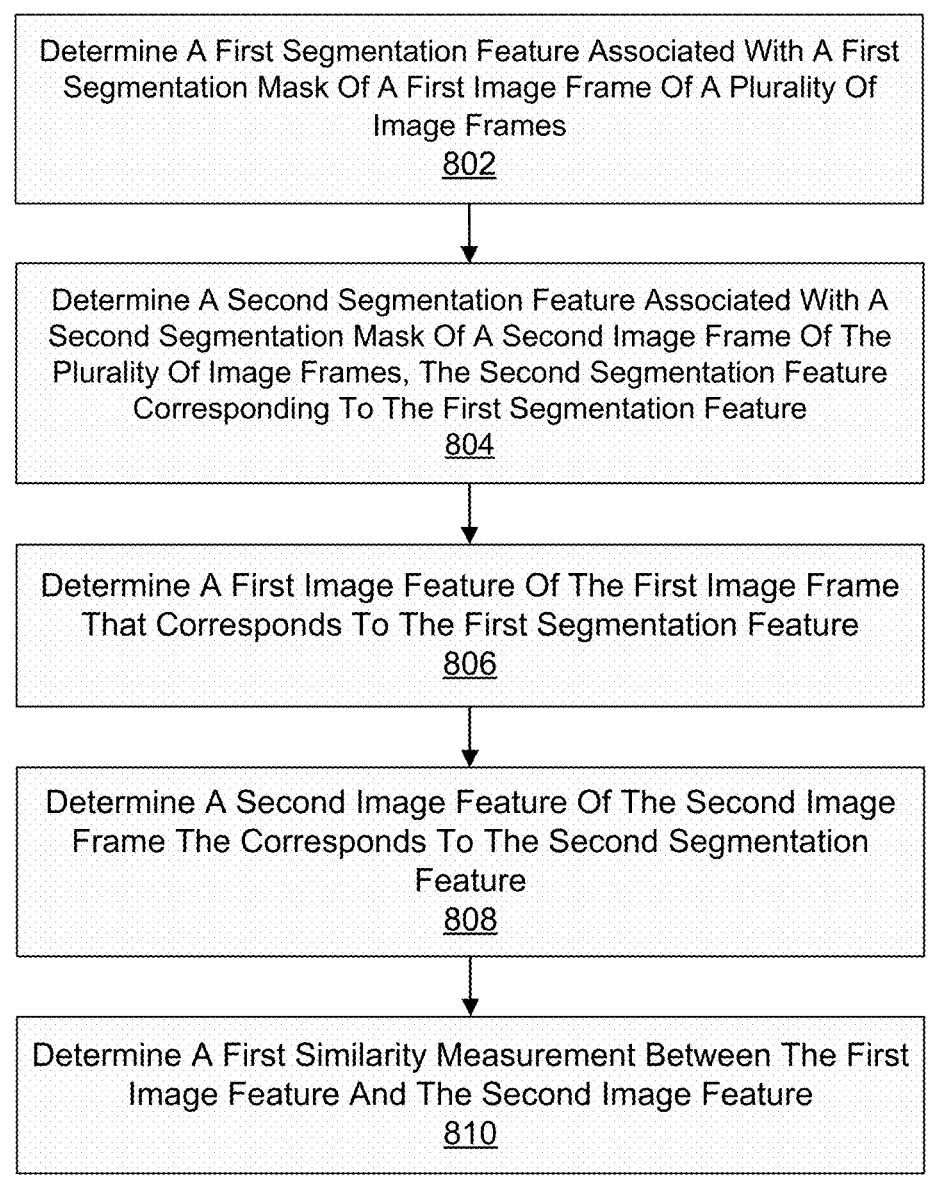
FIG. 8 is a flowchart illustrating an example of a process for evaluating image segmentation processes, in accordance with some examples.

FIG. 8 is a flow diagram illustrating an example process 800 for determining consistency measures for image segmentation processes. The operations outlined herein are examples and can be implemented in any combination thereof, including combinations that exclude, add, or modify certain operations.

At operation 802, the process 800 includes determining a first segmentation feature associated with a first segmentation mask of a first image frame of a plurality of image frames. At operation 804, the process 800 includes determining a second segmentation feature associated with a second segmentation mask of a second mage frame of the plurality of image frames, the second segmentation feature corresponding to the first segmentation feature. In one example, the first image frame can be adjacent to the second image frame. In another example, the plurality of image frames can include at least one intermediate image frame between the first image frame and the second image frame. In some cases, segmentation features associated with the first and second segmentation masks can be determined using a machine learning model trained for image segmentation. In one example, the machine learning model trained for image segmentation can be a neural network including a plurality of layers. In this example, determining the segmentation features associated with the first and second segmentation masks can include obtaining one or more feature maps output by a layer of the plurality of layers of the neural network.

In some examples, determining that the second segmentation feature corresponds to the first segmentation feature can include (1) determining a plurality of segmentation features associated with the second segmentation mask, the plurality of segmentation features including the second segmentation feature, (2) determining a plurality of similarity measurements between the first segmentation feature and the plurality of segmentation features associated with the second segmentation mask, and (3) determining a highest similarity measurement of the plurality of similarity measurements corresponds to the second segmentation feature.

At operation 806, the process 800 includes determining a first image feature of the first image frame that corresponds to the first segmentation feature. At operation 808, the process 800 includes determining a second image feature of the second image frame that corresponds to the second segmentation feature. In some cases, image features of the first image frame and image features of the second image frame can be determined using a machine learning model trained for feature extraction. In some examples, determining the first image feature of the first image frame can include (1) determining a first location within the first image frame corresponding to the first segmentation feature and (2) determining the first image feature of the first image frame based at least in part on the first location. Similarly, determining the second image feature of the second image frame can include (1) determining a second location within the second image frame corresponding to the second segmentation feature and (2) determining second first image feature of the second image frame based at least in part on the second location.

At operation 810, the process 800 includes determining a first similarity measurement between the first image feature and the second image feature. In some examples, determining the first similarity measurement can include comparing first image data corresponding to the first image feature and second image data corresponding to the second image feature. In other examples, determining the first similarity measurement can include comparing a first feature vector corresponding to the first image feature and a second feature vector corresponding to the second image feature. In an illustrative example, the first similarity measurement can be a cosine similarity measurement.

At operation 812, the process 800 includes determining a temporal consistency measurement associated with the first image frame and the second image frame based at least in part on the first similarity measurement.

In some examples, the process 800 can include determining a third segmentation feature associated with the first segmentation mask, and determining a fourth segmentation feature associated with the second segmentation mask. The fourth segmentation feature corresponds to the third segmentation feature. The process 800 can further include determining a third image feature of the first image frame corresponding to the third segmentation feature, determining a fourth image feature of the second image frame corresponding to the fourth segmentation feature, and determining a second similarity measurement between the third image feature and the fourth image feature. In one example, the process 800 can also include determining the temporal consistency measurement associated with the first image frame and the second image frame based at least in part on a representative value (e.g., bi-directional temporal consistency measurement or other representative value) of the first similarity measurement and the second similarity measurement.

Additionally or alternatively, the process 800 can include generating, based on the temporal consistency measurement (e.g., determined based on the first similarity measurement and/or based on the representative value of the first similarity measurement and the second similarity measurement), a temporal consistency map associated with the first image frame and the second image frame. For instance, the temporal consistency map can store the first similarity measurement in association with the first image feature and the second similarity measurement in association with the second image feature.

In some examples, the process 800 can include determining a third segmentation feature associated with a third segmentation mask of a third image frame of the plurality of image frames. The third segmentation feature corresponds to the second segmentation feature. The process 800 can further include determining a third image feature of the third image frame corresponding to the third segmentation feature, and determining a second similarity measurement between the second image feature and the third image feature. In one example, the process 800 can also include determining a temporal consistency measurement associated with the first image frame and the third image frame based at least in part on the first similarity measurement and the second similarity measurement.

In some examples, the process 800 can include generating the first and second segmentation masks using a machine learning model trained for image segmentation. The process 800 can further include determining a quality of the machine learning model based at least in part on the first similarity measurement and/or based on the temporal consistency measurement. In such examples, a value of the first similarity measurement is associated with a quality (e.g., a high value is associated with a high quality) of the machine learning model. Additionally or alternatively, the process 800 can include generating the first and second segmentation masks using a machine learning model being trained for image segmentation. The process 800 can further include using the first similarity measurement as feedback for training the machine learning model for image segmentation.

In some examples, the process 800 and/or other processes described herein may be performed by one or more computing devices or apparatuses. In some examples, the process 800 and/or other processes described herein can be performed by the image segmentation system 102 shown in FIG. 1, the image segmentation evaluation system 400 shown in FIG. 4, and/or one or more computing devices with the computing device architecture 1100 shown in FIG. 1100. In some cases, such a computing device or apparatus may include a processor, microprocessor, microcomputer, or other component of a device that is configured to carry out the steps of the process 800. In some examples, such computing device or apparatus may include one or more sensors configured to capture image data. For example, the computing device can include a smartphone, a camera, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 800 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As described above, in some cases, systems and techniques described herein can be implemented using a neural network-based machine learning system. Illustrative examples of neural networks that can be used include one or more convolutional neural networks (CNNs), autoencoders, deep belief nets (DBNs), Recurrent Neural Networks (RNNs), Generative Adversarial Networks (GANs), Gated Recurrent Unit (GRUs), any combination thereof, and/or any other suitable neural network.

Figure 9:
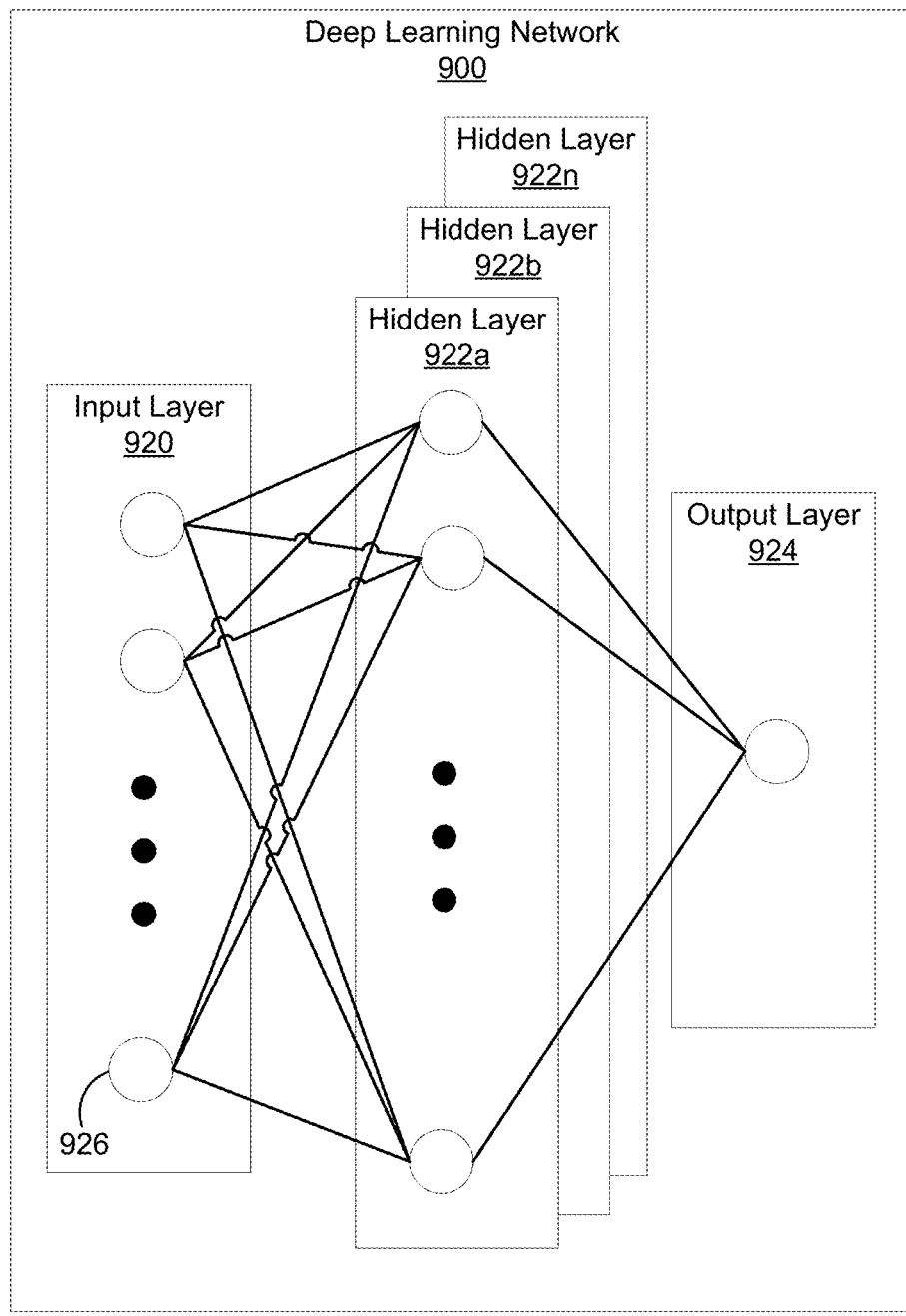
FIG. 9 is a block diagram illustrating an example of a deep learning network, in accordance with some examples.

FIG. 9 is an illustrative example of a deep learning neural network 900 that can be used by an object detector. An input layer 920 includes input data. In one illustrative example, the input layer 920 can include data representing the pixels of an input video frame. The neural network 900 includes multiple hidden layers 922a, 922b, through 922n. The hidden layers 922a, 922b, through 922n include "n" number of hidden layers, where "n" is an integer greater than or equal to one. The number of hidden layers can be made to include as many layers as needed for the given application. The neural network 900 further includes an output layer 924 that provides an output resulting from the processing performed by the hidden layers 922a, 922b, through 922n. In one illustrative example, the output layer 924 can provide a classification for an object in an input video frame. The classification can include a class identifying the type of object (e.g., a person, a dog, a cat, or other object).

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922a. For example, as shown, each of the input nodes of the input layer 920 is connected to each of the nodes of the first hidden layer 922a. The nodes of the hidden layers 922a, 922b, through 922n can transform the information of each input node by applying activation functions to these information. The information derived from the transformation can then be passed to and can activate the nodes of the next hidden layer 922b, which can perform their own designated functions. Example functions include convolutional, up-sampling, data transformation, and/or any other suitable functions. The output of the hidden layer 922b can then activate nodes of the next hidden layer, and so on. The output of the last hidden layer 922n can activate one or more nodes of the output layer 924, at which an output is provided. In some cases, while nodes (e.g., node 926) in the neural network 900 are shown as having multiple output lines, a node has a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922a, 922b, through 922n in order to provide the output through the output layer 924. In an example in which the neural network 900 is used to identify objects in images, the neural network 900 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 900 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 900 is trained well enough so that the weights of the layers are accurately tuned.

For the example of identifying objects in images, the forward pass can include passing a training image through the neural network 900. The weights are initially randomized before the neural network 900 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 900, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 900 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total} = \Sigma \frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 900 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

The neural network 900 can include any suitable deep network. One example includes a convolutional neural network (CNN), which includes an input layer and an output layer, with multiple hidden layers between the input and out layers. An example of a CNN is described below with respect to FIG. 9. The hidden layers of a CNN include a series of convolutional, nonlinear, pooling (for downsampling), and fully connected layers. The neural network 900 can include any other deep network other than a CNN, such as an autoencoder, a deep belief nets (DBNs), a Recurrent Neural Networks (RNNs), among others.

Figure 10:
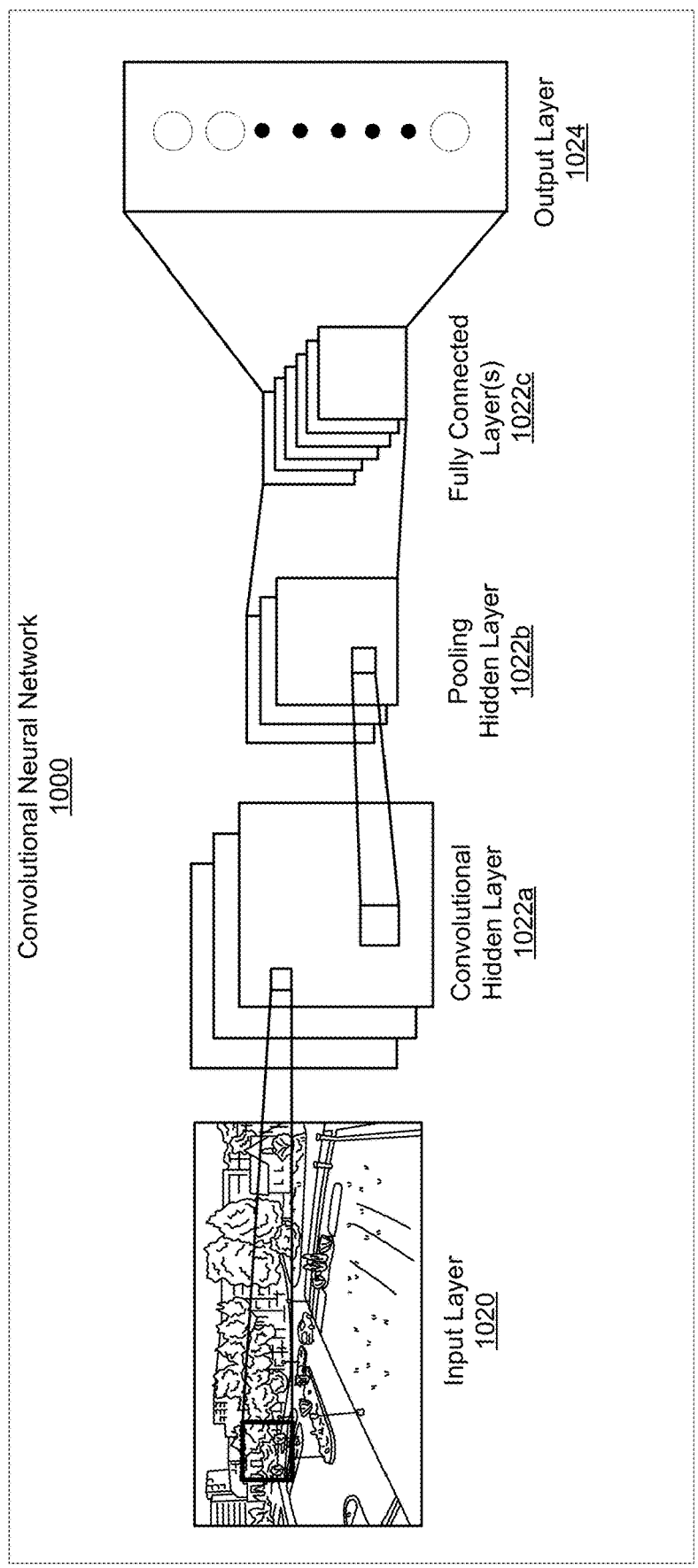
FIG. 10 is a block diagram illustrating an example of a convolutional neural network, in accordance with some examples.

FIG. 10 is an illustrative example of a convolutional neural network 1000 (CNN 1000). The input layer 1020 of the CNN 1000 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1022a, an optional non-linear activation layer, a pooling hidden layer 1022b, and fully connected hidden layers 1022c to get an output at the output layer 1024. While only one of each hidden layer is shown in FIG. 10, one of ordinary skill will appreciate that multiple convolutional hidden layers, non-linear layers, pooling hidden layers, and/or fully connected layers can be included in the CNN 1000. As previously described, the output can indicate a single class of an object or can include a probability of classes that best describe the object in the image.

The first layer of the CNN 1000 is the convolutional hidden layer 1022a. The convolutional hidden layer 1022a analyzes the image data of the input layer 1020. Each node of the convolutional hidden layer 1022a is connected to a region of nodes (pixels) of the input image called a receptive field. The convolutional hidden layer 1022a can be considered as one or more filters (each filter corresponding to a different activation or feature map), with each convolutional iteration of a filter being a node or neuron of the convolutional hidden layer 1022a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1022a. Each connection between a node and a receptive field for that node learns a weight and, in some cases, an overall bias such that each node learns to analyze its particular local receptive field in the input image.

Each node of the hidden layer 1022a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1022a is due to each node of the convolutional layer being applied to its corresponding receptive field. For example, a filter of the convolutional hidden layer 1022a can begin in the top-left corner of the input image array and can convolve around the input image. As noted above, each convolutional iteration of the filter can be considered a node or neuron of the convolutional hidden layer 1022a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1022a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1022a.

The mapping from the input layer to the convolutional hidden layer 1022a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1022a can include several activation maps in order to identify multiple features in an image. The example shown in FIG. 10 includes three activation maps. Using three activation maps, the convolutional hidden layer 1022a can detect three different kinds of features, with each feature being detectable across the entire image.

In some examples, a non-linear hidden layer can be applied after the convolutional hidden layer 1022a. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the network 1000 without affecting the receptive fields of the convolutional hidden layer 1022a.

The pooling hidden layer 1022b can be applied after the convolutional hidden layer 1022a (and after the non-linear hidden layer when used). The pooling hidden layer 1022b is used to simplify the information in the output from the convolutional hidden layer 1022a. For example, the pooling hidden layer 1022b can take each activation map output from the convolutional hidden layer 1022a and generates a condensed activation map (or feature map) using a pooling function. Max-pooling is one example of a function performed by a pooling hidden layer. Other forms of pooling functions be used by the pooling hidden layer 1022a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1022a. In the example shown in FIG. 10, three pooling filters are used for the three activation maps in the convolutional hidden layer 1022a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1022a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1022a having a dimension of 24×24 nodes, the output from the pooling hidden layer 1022b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1000.

The final layer of connections in the network is a fully-connected layer that connects every node from the pooling hidden layer 1022b to every one of the output nodes in the output layer 1024. Using the example above, the input layer includes 28×28 nodes encoding the pixel intensities of the input image, the convolutional hidden layer 1022a includes 3×24×24 hidden feature nodes based on application of a 5×5 local receptive field (for the filters) to three activation maps, and the pooling layer 1022b includes a layer of 3×12×12 hidden feature nodes based on application of max-pooling filter to 2×2 regions across each of the three feature maps. Extending this example, the output layer 1024 can include ten output nodes. In such an example, every node of the 3×12×12 pooling hidden layer 1022b is connected to every node of the output layer 1024.

The fully connected layer 1022c can obtain the output of the previous pooling layer 1022b (which should represent the activation maps of high-level features) and determines the features that most correlate to a particular class. For example, the fully connected layer 1022c layer can determine the high-level features that most strongly correlate to a particular class, and can include weights (nodes) for the high-level features. A product can be computed between the weights of the fully connected layer 1022c and the pooling hidden layer 1022b to obtain probabilities for the different classes. For example, if the CNN 1000 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1024 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 11:
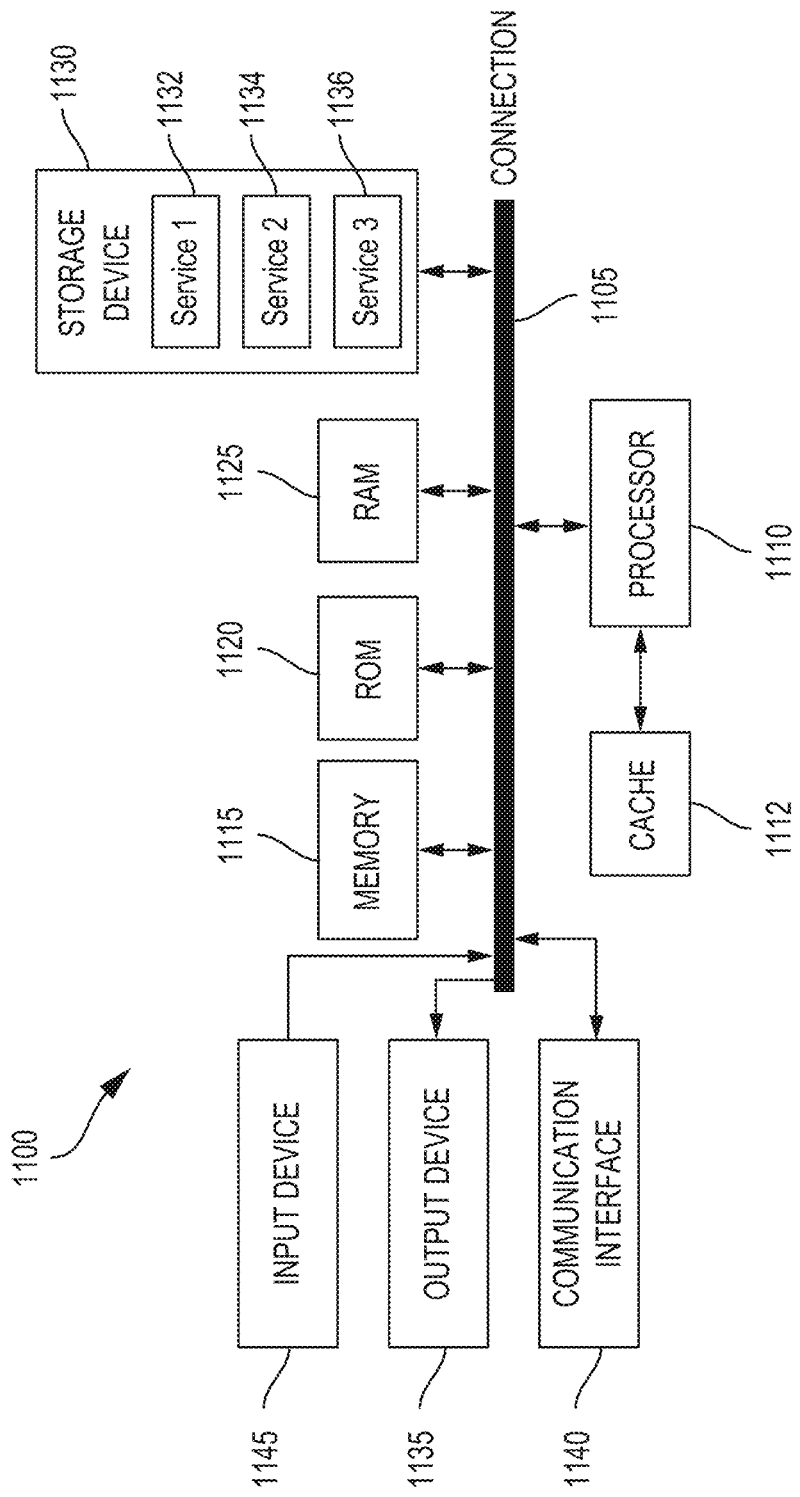
FIG. 11 is a diagram illustrating an example of a system for implementing certain aspects described herein.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some examples, computing system 1100 is a distributed system in which the functions described in this disclosure can be distributed within a datacenter, multiple data centers, a peer network, etc. In some examples, one or more of the described system components represents many such components each performing some or all of the function for which the component is described. In some cases, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1135 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1102.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some examples, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Aspect 1: An apparatus for determining consistency measures for image segmentation processes. The apparatus includes at least one memory and at least one processor coupled to the at least one memory and configured to: determine a first segmentation feature associated with a first segmentation mask of a first image frame of a plurality of image frames; determine a second segmentation feature associated with a second segmentation mask of a second image frame of the plurality of image frames, the second segmentation feature corresponding to the first segmentation feature; determine a first image feature of the first image frame that corresponds to the first segmentation feature; determine a second image feature of the second image frame that corresponds to the second segmentation feature; determine a first similarity measurement between the first image feature and the second image feature; and determine a temporal consistency measurement associated with the first image frame and the second image frame based at least in part on the first similarity measurement.

Aspect 2: An apparatus according to Aspect 1, wherein the first image frame is adjacent to the second image frame within the plurality of image frames.

Aspect 3. An apparatus according to any one of Aspects 1 or 2, wherein the plurality of image frames includes at least one intermediate image frame between the first image frame and the second image frame.

Aspect 4: An apparatus according to any one of Aspects 1 to 3, wherein the at least one processor is configured to determine that the second segmentation feature corresponds to the first segmentation feature based at least in part on: determining a plurality of segmentation features associated with the second segmentation mask, the plurality of segmentation features including the second segmentation feature; determining a plurality of similarity measurements between the first segmentation feature and the plurality of segmentation features associated with the second segmentation mask; and determining a highest similarity measurement of the plurality of similarity measurements corresponds to the second segmentation feature.

Aspect 5: An apparatus according to any of Aspects 1 to 4, wherein the at least one processor is configured to determine segmentation features associated with the first segmentation mask and the second segmentation mask using a machine learning model trained for image segmentation.

Aspect 6: An apparatus according to Aspect 5, wherein: the machine learning model trained for image segmentation is a neural network including a plurality of layers; and the at least one processor is configured to determine the segmentation features associated with the first segmentation mask and the second segmentation mask based at least in part on one or more feature maps output by a layer of the plurality of layers of the neural network.

Aspect 7: An apparatus according to any one of Aspect 1 to 6, wherein the at least one processor is configured to determine image features of the first image frame and image features of the second image frame using a machine learning model trained for feature extraction.

Aspect 8: An apparatus according to of any one of Aspects 1 to 7, wherein the at least one processor is further configured to: determine a first location within the first image frame corresponding to the first segmentation feature; determine the first image feature of the first image frame based at least in part on the first location; determine a second location within the second image frame corresponding to the second segmentation feature; and determine the second image feature of the second image frame based at least in part on the second location.

Aspect 9: An apparatus according to any one of Aspects 1 to 8, wherein the at least one processor is configured to determine the first similarity measurement between the first image feature and the second image feature based at least in part on a comparison between first image data corresponding to the first image feature and second image data corresponding to the second image feature.

Aspect 10: An apparatus according to any one of Aspects 1 to 9, wherein the at least one processor is configured to determine the first similarity measurement between the first image feature and the second image feature based at least in part on a comparison between a first feature vector corresponding to the first image feature and a second feature vector corresponding to the second image feature.

Aspect 11: An apparatus according to any one of Aspects 1 to 10, wherein the first similarity measurement between the first image feature and the second image feature is a cosine similarity measurement.

Aspect 12: An apparatus according to any one of Aspects 1 to 11, wherein the at least one processor is configured to: determine a third segmentation feature associated with the first segmentation mask; determine a fourth segmentation feature associated with the second segmentation mask, the fourth segmentation feature corresponding to the third segmentation feature; determine a third image feature of the first image frame corresponding to the third segmentation feature; determine a fourth image feature of the second image frame corresponding to the fourth segmentation feature; and determine a second similarity measurement between the third image feature and the fourth image feature.

Aspect 13: An apparatus according to Aspect 12, wherein the at least one processor is configured to determine the temporal consistency measurement associated with the first image frame and the second image frame based at least in part on a representative value of the first similarity measurement and the second similarity measurement.

Aspect 14: An apparatus according to any one of Aspects 12 or 13, wherein, based on the temporal consistency measurement, the at least one processor is configured to generate a temporal consistency map associated with the first image frame and the second image frame, wherein the temporal consistency map stores the first similarity measurement in association with the first image feature and the second similarity measurement in association with the second image feature.

Aspect 15: An apparatus according to any one of Aspects 1 to 14, wherein the at least one processor is configured to: determine a third segmentation feature associated with a third segmentation mask of a third image frame of the plurality of image frames, the third segmentation feature corresponding to the second segmentation feature; determine a third image feature of the third image frame corresponding to the third segmentation feature; and determine a second similarity measurement between the second image feature and the third image feature.

Aspect 16: An apparatus according to Aspect 15, wherein the at least one processor is configured to determine a temporal consistency measurement associated with the first image frame and the third image frame based at least in part on the first similarity measurement and the second similarity measurement.

Aspect 17: An apparatus according to any one of Aspects 1 to 16, wherein the at least one processor is configured to: generate the first segmentation mask and the second segmentation mask using a machine learning model trained for image segmentation; and determine a quality of the machine learning model based at least in part on the temporal consistency measurement, wherein a value of the temporal consistency measurement is associated with a quality of the machine learning model.

Aspect 18: An apparatus according to any one of Aspects 1 to 17, wherein the at least one processor is configured to: generate the first segmentation mask and the second segmentation mask using a machine learning model being trained for image segmentation; and use the first similarity measurement as feedback for training the machine learning model for image segmentation.

Aspect 19: A method for determining consistency measures for segmentation processes. The method includes: determining a first segmentation feature associated with a first segmentation mask of a first image frame of a plurality of image frames; determining a second segmentation feature associated with a second segmentation mask of a second image frame of the plurality of image frames, the second segmentation feature corresponding to the first segmentation feature; determining a first image feature of the first image frame that corresponds to the first segmentation feature; determining a second image feature of the second image frame that corresponds to the second segmentation feature; determining a first similarity measurement between the first image feature and the second image feature; and determine a temporal consistency measurement associated with the first image frame and the second image frame based at least in part on the first similarity measurement.

Aspect 20: A method according to Aspect 19, wherein the first image frame is adjacent to the second image frame within the plurality of image frames.

Aspect 21: A method according to any one of Aspects 19 or 20, wherein the plurality of image frames includes at least one intermediate image frame between the first image frame and the second image frame.

Aspect 22: A method according any one of claims 19 to 21, further comprising determining that the second segmentation feature corresponds to the first segmentation feature based at least in part on: determining a plurality of segmentation features associated with the second segmentation mask, the plurality of segmentation features including the second segmentation feature; determining a plurality of similarity measurements between the first segmentation feature and the plurality of segmentation features associated with the second segmentation mask; and determining a highest similarity measurement of the plurality of similarity measurements corresponds to the second segmentation feature.

Aspect 23: A method according to any one of Aspects 19 to 22, further comprising determining segmentation features associated with the first segmentation mask and the second segmentation mask using a machine learning model trained for image segmentation.

Aspect 24: A method according to Aspect 23, wherein: the machine learning model trained for image segmentation is a neural network including a plurality of layers; and determining the segmentation features associated with the first segmentation mask and the second segmentation mask includes obtaining one or more feature maps output by a layer of the plurality of layers of the neural network.

Aspect 25: A method according to any one of Aspects 19 to 24, further comprising determining image features of the first image frame and image features of the second image frame using a machine learning model trained for feature extraction.

Aspect 26: A method according to any one of Aspects 19 to 25, further comprising: determining a first location within the first image frame corresponding to the first segmentation feature; determining the first image feature of the first image frame based at least in part on the first location; determining a second location within the second image frame corresponding to the second segmentation feature; and determining the second image feature of the second image frame based at least in part on the second location.

Aspect 27: A method according to any one of Aspects 19 to 26, wherein determining the first similarity measurement between the first image feature and the second image feature includes comparing first image data corresponding to the first image feature and second image data corresponding to the second image feature.

Aspect 28: A method according to any one of Aspects 19 to 27, wherein determining the first similarity measurement between the first image feature and the second image feature includes comparing a first feature vector corresponding to the first image feature and a second feature vector corresponding to the second image feature.

Aspect 29: A method according to any one of Aspects 19 to 28, wherein the first similarity measurement between the first image feature and the second image feature is a cosine similarity measurement.

Aspect 30: A method according to any one of Aspects 19 to 29, further comprising: determining a third segmentation feature associated with the first segmentation mask; determining a fourth segmentation feature associated with the second segmentation mask, the fourth segmentation feature corresponding to the third segmentation feature; determining a third image feature of the first image frame corresponding to the third segmentation feature; determining a fourth image feature of the second image frame corresponding to the fourth segmentation feature; and determining a second similarity measurement between the third image feature and the fourth image feature.

Aspect 31: A method according to Aspect 30, further comprising determining the temporal consistency measurement associated with the first image frame and the second image frame based at least in part on a representative value of the first similarity measurement and the second similarity measurement.

Aspect 32: A method according to any one of Aspects 30 or 31, further comprising generating, based on the temporal consistency measurement, a temporal consistency map associated with the first image frame and the second image frame, wherein the temporal consistency map stores the first similarity measurement in association with the first image feature and the second similarity measurement in association with the second image feature.

Aspect 33: A method according to any one of Aspects 19 to 32, further comprising: determining a third segmentation feature associated with a third segmentation mask of a third image frame of the plurality of image frames, the third segmentation feature corresponding to the second segmentation feature; determining a third image feature of the third image frame corresponding to the third segmentation feature; and determining a second similarity measurement between the second image feature and the third image feature.

Aspect 34: A method according to Aspect 33, further comprising determining a temporal consistency measurement associated with the first image frame and the third image frame based at least in part on the first similarity measurement and the second similarity measurement.

Aspect 35: A method according to any one of Aspects 19 to 34, further comprising generating the first segmentation mask and the second segmentation mask using a machine learning model trained for image segmentation; and determining a quality of the machine learning model based at least in part on the temporal consistency measurement, wherein a value of the temporal consistency measurement is associated with a quality of the machine learning model.

Aspect 36: A method according to any one of Aspects 19 to 35, further comprising: generating the first segmentation mask and the second segmentation mask using a machine learning model being trained for image segmentation; and using the first similarity measurement as feedback for training the machine learning model for image segmentation.

Aspect 37: A non-transitory computer-readable storage medium for determining consistency measures for image segmentation processes. The non-transitory computer-readable storage medium includes instructions stored therein which, when executed by one or more processors, cause the one or more processors to perform any of the operations of Aspects 1 to 36.

Aspect 38: An image segmentation system including one or more means for performing any of the operations of Aspects 1 to 36.

What is claimed is:

1. An apparatus for determining consistency measures for image segmentation processes, the apparatus comprising:
at least one memory; and
at least one processor coupled to the at least one memory, the at least one processor configured to:
determine a first segmentation feature associated with a first segmentation mask of a first image frame of a plurality of image frames;
determine a second segmentation feature associated with a second segmentation mask of a second image frame of the plurality of image frames;
determine the second segmentation feature corresponds to the first segmentation feature;
determine a first location of the first segmentation feature associated with the first segmentation mask;
determine a second location of the second segmentation feature associated with the second segmentation mask;
determine a first location within the first image frame or a first feature map associated with the first image frame that corresponds to the first location of the first segmentation feature;
determine a second location within the second image frame or a second feature map associated with the second image frame that corresponds to the second location of the second segmentation feature;
determine a first image feature at the first location within the first image frame or the first feature map and determine a second image feature at the second location within the second image frame or the second feature map;
based on the determination that the second segmentation feature corresponds to the first segmentation feature, determine a first similarity measurement between the first image feature and the second image feature; and
determine a temporal consistency measurement associated with the first image frame and the second image frame based at least in part on the first similarity measurement.

2. The apparatus of claim 1, wherein the first image frame is adjacent to the second image frame within the plurality of image frames.

3. The apparatus of claim 1, wherein the plurality of image frames includes at least one intermediate image frame between the first image frame and the second image frame.

4. The apparatus of claim 1, wherein the at least one processor is configured to determine that the second segmentation feature corresponds to the first segmentation feature based at least in part on:
determining a plurality of segmentation features associated with the second segmentation mask, the plurality of segmentation features including the second segmentation feature;
determining a plurality of similarity measurements between the first segmentation feature and the plurality of segmentation features associated with the second segmentation mask; and
determining a highest similarity measurement of the plurality of similarity measurements corresponds to the second segmentation feature.

5. The apparatus of claim 1, wherein the at least one processor is configured to determine segmentation features associated with the first segmentation mask and the second segmentation mask using a machine learning model trained for image segmentation.

6. The apparatus of claim 5, wherein:
the machine learning model trained for image segmentation is a neural network including a plurality of layers; and
the at least one processor is configured to determine the segmentation features associated with the first segmentation mask and the second segmentation mask based at least in part on one or more feature maps output by a layer of the plurality of layers of the neural network.

7. The apparatus of claim 1, wherein the at least one processor is configured to determine image features of the first image frame and image features of the second image frame using a machine learning model trained for feature extraction.

8. The apparatus of claim 7, wherein the at least one processor is configured to generate the first feature map and the second feature map using the machine learning model.

9. The apparatus of claim 1, wherein the at least one processor is configured to determine the first similarity measurement between the first image feature and the second image feature based at least in part on a comparison between first image data corresponding to the first image feature and second image data corresponding to the second image feature.

10. The apparatus of claim 1, wherein the at least one processor is configured to determine the first similarity measurement between the first image feature and the second image feature based at least in part on a comparison between a first feature vector corresponding to the first image feature and a second feature vector corresponding to the second image feature.

11. The apparatus of claim 1, wherein the first similarity measurement between the first image feature and the second image feature is a cosine similarity measurement.

12. The apparatus of claim 1, wherein the at least one processor is configured to:
determine a third segmentation feature associated with the first segmentation mask;
determine a fourth segmentation feature associated with the second segmentation mask, the fourth segmentation feature corresponding to the third segmentation feature;
determine a third image feature of the first image frame corresponding to the third segmentation feature;
determine a fourth image feature of the second image frame corresponding to the fourth segmentation feature; and
determine a second similarity measurement between the third image feature and the fourth image feature.

13. The apparatus of claim 12, wherein the at least one processor is configured to determine the temporal consistency measurement associated with the first image frame and the second image frame based at least in part on a representative value of the first similarity measurement and the second similarity measurement.

14. The apparatus of claim 12, wherein, based on the temporal consistency measurement, the at least one processor is configured to generate a temporal consistency map associated with the first image frame and the second image frame, wherein the temporal consistency map stores the first similarity measurement in association with the first image feature and the second similarity measurement in association with the second image feature.

15. The apparatus of claim 1, wherein the at least one processor is configured to:

determine a third segmentation feature associated with a third segmentation mask of a third image frame of the plurality of image frames, the third segmentation feature corresponding to the second segmentation feature;
determine a third image feature of the third image frame corresponding to the third segmentation feature; and
determine a second similarity measurement between the second image feature and the third image feature.

16. The apparatus of claim 15, wherein the at least one processor is configured to determine a temporal consistency measurement associated with the first image frame and the third image frame based at least in part on the first similarity measurement and the second similarity measurement.

17. The apparatus of claim 1, wherein the at least one processor is configured to:
generate the first segmentation mask and the second segmentation mask using a machine learning model trained for image segmentation; and
determine a quality of the machine learning model based at least in part on the temporal consistency measurement, wherein a value of the temporal consistency measurement is associated with a quality of the machine learning model.

18. The apparatus of claim 1, wherein the at least one processor is configured to:
generate the first segmentation mask and the second segmentation mask using a machine learning model trained for image segmentation; and
use the first similarity measurement as feedback for training the machine learning model for image segmentation.

19. A method for determining consistency measures for image segmentation processes, the method comprising:
determining a first segmentation feature associated with a first segmentation mask of a first image frame of a plurality of image frames;
determining a second segmentation feature associated with a second segmentation mask of a second image frame of the plurality of image frames;
determining the second segmentation feature corresponds to the first segmentation feature;
determining a first location of the first segmentation feature associated with the first segmentation mask;
determining a second location of the second segmentation feature associated with the second segmentation mask;
determining a first location within the first image frame or a first feature map associated with the first image frame that corresponds to the first location of the first segmentation feature;
determining a second location within the second image frame or a second feature map associated with the second image frame that corresponds to the second location of the second segmentation feature;
determining a first image feature at the first location within the first image frame or the first feature map;
determining a second image feature at the second location within the second image frame or the second feature map;
based on determining that the second segmentation feature corresponds to the first segmentation feature, determining a first similarity measurement between the first image feature and the second image feature; and
determining a temporal consistency measurement associated with the first image frame and the second image frame based at least in part on the first similarity measurement.

20. The method of claim 19, further comprising determining that the second segmentation feature corresponds to the first segmentation feature based at least in part on:
- determining a plurality of segmentation features associated with the second segmentation mask, the plurality of segmentation features including the second segmentation feature;
- determining a plurality of similarity measurements between the first segmentation feature and the plurality of segmentation features associated with the second segmentation mask; and
- determining a highest similarity measurement of the plurality of similarity measurements corresponds to the second segmentation feature.

21. The method of claim 19, further comprising determining segmentation features associated with the first segmentation mask and the second segmentation mask using a machine learning model trained for image segmentation.

22. The method of claim 21, wherein:
- the machine learning model trained for image segmentation is a neural network including a plurality of layers; and
- determining the segmentation features associated with the first segmentation mask and the second segmentation mask includes obtaining one or more feature maps output by a layer of the plurality of layers of the neural network.

23. The method of claim 19, further comprising determining image features of the first image frame and image features of the second image frame using a machine learning model trained for feature extraction.

24. The method of claim 23, further comprising generating the first feature map and the second feature map using the machine learning model.

25. The method of claim 19, wherein determining the first similarity measurement between the first image feature and the second image feature includes comparing first image data corresponding to the first image feature and second image data corresponding to the second image feature.

26. The method of claim 19, wherein determining the first similarity measurement between the first image feature and the second image feature includes comparing a first feature vector corresponding to the first image feature and a second feature vector corresponding to the second image feature.

27. The method of claim 19, further comprising:
- determining a third segmentation feature associated with the first segmentation mask;
- determining a fourth segmentation feature associated with the second segmentation mask, the fourth segmentation feature corresponding to the third segmentation feature;
- determining a third image feature of the first image frame corresponding to the third segmentation feature;
- determining a fourth image feature of the second image frame corresponding to the fourth segmentation feature; and
- determining a second similarity measurement between the third image feature and the fourth image feature.

28. The method of claim 27, further comprising determining the temporal consistency measurement associated with the first image frame and the second image frame based at least in part on a representative value of the first similarity measurement and the second similarity measurement.

29. The method of claim 27, further comprising generating, based on the temporal consistency measurement, a temporal consistency map associated with the first image frame and the second image frame, wherein the temporal consistency map stores the first similarity measurement in association with the first image feature and the second similarity measurement in association with the second image feature.

30. The method of claim 19, further comprising:
- determining a third segmentation feature associated with a third segmentation mask of a third image frame of the plurality of image frames, the third segmentation feature corresponding to the second segmentation feature;
- determining a third image feature of the third image frame corresponding to the third segmentation feature;
- determining a second similarity measurement between the second image feature and the third image feature; and
- determining a temporal consistency measurement associated with the first image frame and the third image frame based at least in part on the first similarity measurement and the second similarity measurement.

* * * * *